(12) United States Patent
Malik et al.

(10) Patent No.: US 9,181,135 B2
(45) Date of Patent: Nov. 10, 2015

(54) COMPOSITE COMPACTS FORMED OF CERAMICS AND LOW VOLUME CUBIC BORON NITRIDE AND METHOD OF MANUFACTURE

(75) Inventors: Abds-Sami Malik, Westerville, OH (US); Jacob S. Palmer, Westerville, OH (US)

(73) Assignee: Diamond Innovations, Inc., Worthington, OH (US)

(*) Notice: Subject to any disclaimer, the term of this patent is extended or adjusted under 35 U.S.C. 154(b) by 140 days.

(21) Appl. No.: 13/517,672

(22) Filed: Jun. 14, 2012

(65) Prior Publication Data
US 2012/0329632 A1    Dec. 27, 2012

Related U.S. Application Data

(60) Provisional application No. 61/499,352, filed on Jun. 21, 2011.

(51) Int. Cl.
*C04B 35/00* (2006.01)
*C04B 35/5831* (2006.01)
*C04B 35/56* (2006.01)
(Continued)

(52) U.S. Cl.
CPC ........... *C04B 35/5831* (2013.01); *C04B 35/119* (2013.01); *C04B 35/5611* (2013.01); *C04B 35/58014* (2013.01); *C04B 35/645* (2013.01); *C04B 2235/3217* (2013.01); *C04B 2235/3244* (2013.01); *C04B 2235/3246* (2013.01); *C04B 2235/3804* (2013.01); *C04B 2235/3813* (2013.01); *C04B 2235/3817* (2013.01); *C04B 2235/3826* (2013.01); *C04B 2235/3839* (2013.01); *C04B 2235/3843* (2013.01); *C04B 2235/3852* (2013.01); *C04B 2235/3865* (2013.01); *C04B 2235/3873* (2013.01); *C04B 2235/3886* (2013.01); *C04B 2235/402* (2013.01); *C04B 2235/428* (2013.01);
(Continued)

(58) Field of Classification Search
CPC .. C04B 35/581; C04B 35/645; C04B 35/583; C04B 35/5831; C04B 35/447; C04B 35/48; C04B 35/486
USPC .................. 501/102, 103, 96.1, 96.4; 428/704
See application file for complete search history.

(56) References Cited

U.S. PATENT DOCUMENTS

| | | | |
|---|---|---|---|
| 2,941,248 A | 6/1960 | Hall | |
| 3,767,371 A | 10/1973 | Wentorf, Jr. et al. | |

(Continued)

FOREIGN PATENT DOCUMENTS

| | | | |
|---|---|---|---|
| JP | 55062863 A | 5/1980 | |
| JP | 55065347 A | 5/1980 | |

(Continued)

*Primary Examiner* — Noah Wiese
(74) *Attorney, Agent, or Firm* — Keith G. DeMaggio

(57) ABSTRACT

A composite compact formed by sintering, at high temperature/high pressure, a composition including cBN in a range of about 5 to about 60 vol. %, zirconia (or in the range about 5 to about 20 vol. %), and other ceramic material. Subsequent to sintering, the zirconia exists in the cubic phase and/or tetragonal phase. The zirconia may be either stabilized or unstabilized prior to sintering. The other ceramic material may include one or more of nitrides, borides, and carbides of Ti, Zr, Hf, Al, Si, or $Al_2O_3$. Some of the ceramic material is formed during the sintering process. The compact can be bonded to a tungsten carbide substrate during the sintering process.

29 Claims, 29 Drawing Sheets

(51) Int. Cl.
*C04B 35/58* (2006.01)
*C04B 35/645* (2006.01)
*C04B 35/119* (2006.01)

(52) U.S. Cl.
CPC .................. *C04B 2235/5436* (2013.01); *C04B 2235/5445* (2013.01); *C04B 2235/80* (2013.01)

(56) References Cited

U.S. PATENT DOCUMENTS

| | | | |
|---|---|---|---|
| 6,287,489 B1 | 9/2001 | Rolander et al. | |
| 6,962,751 B2 * | 11/2005 | Fukui et al. | 428/408 |
| 2007/0134494 A1 * | 6/2007 | Dole et al. | 428/403 |
| 2010/0313489 A1 * | 12/2010 | Teramoto et al. | 51/309 |

FOREIGN PATENT DOCUMENTS

| | | | | |
|---|---|---|---|---|
| JP | 58107434 A | 6/1983 | | |
| JP | 63303029 A | 12/1988 | | |
| JP | 2092868 A | 4/1990 | | |
| JP | 2282444 A | 11/1990 | | |
| JP | 3205364 A | 9/1991 | | |
| JP | 4026554 A | 1/1992 | | |
| JP | WO/2011/059020 | * | 5/2011 | ............ C04B 35/583 |
| WO | 2007148214 A2 | 12/2007 | | |
| WO | 2011059020 A1 | 5/2011 | | |
| WO | 2012003443 A2 | 1/2012 | | |
| WO | 2012057183 A1 | 5/2012 | | |
| WO | 2012057184 A1 | 5/2012 | | |

* cited by examiner

COMPOSITE COMPACTS FORMED OF CERAMICS AND LOW VOLUME CUBIC BORON NITRIDE AND METHOD OF MANUFACTURE

CROSS-REFERENCE TO RELATED APPLICATIONS

This application is based on and claims the priority benefit of previously file U.S. Provisional Patent Application No. 61/499,352, which was filed Jun. 21, 2011, disclosure of which is incorporated herein, in its entirety, by this reference.

TECHNICAL FIELD AND INDUSTRIAL APPLICABILITY

The present disclosure relates to cutting inserts. More particularly, the present disclosure relates to cBN/ceramic composite compacts useful in the machining of metal, especially hard metal parts.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

The synthesis of cubic boron nitride (cBN), at pressures>60 kBar and temperatures>1350° C., was accomplished by Robert H. Wentorf, Jr., of the General Electric Co. (GE). Subsequent development led to the realization that aluminum and its alloys were useful for catalyzing the transformation of hexagonal boron nitride (hBN) to cBN at lower pressures.

Polycrystalline cBN (PCBN) compacts have been manufactured with high (>60 vol. %) content of cBN in order to render the compacts hard and tough. However, it has been found that in certain machining applications such compacts do not exhibit good performance. For example, when machining hard (>50 HRc) steels or compacted graphite iron (CGI), the heat (~1000° C.) generated by friction at the tool tip apparently promotes back conversion of the cBN to its hexagonal form and leads to rapid wear and failure of the PCBN tool. This is commonly referred to as 'chemical wear' and can be mitigated by reducing the amount of cBN, e.g., to <50 vol. %, and replacing it with conventional, heat resistant ceramics such as $Al_2O_3$, TiN, $Si_3N_4$, etc. However, those conventional ceramics are less tough and generally quite brittle, so PCBN compacts comprised thereof are more prone to fail in the machining application by fracturing.

It is known that in the manufacturing of a ceramic such as $Al_2O_3$, the addition of up to 15 vol. % zirconia ($ZrO_2$) in the tetragonal and/or cubic phase or structure leads to a doubling of fracture toughness over $Al_2O_3$ that contains no $ZrO_2$. When a crack develops and propagates through the alumina and encounters a zirconium oxide crystallite, the tetragonal (and/or cubic) structure is transformed to a monoclinic structure, thereby absorbing crack energy. Despite being toughened by the tetragonal or cubic zirconia, such ceramic materials may not possess sufficient hardness or resistance to thermal shock to perform optimally when machining hard steels or CGI.

Therefore, it can be seen that there is a need for a better cBN/ceramic compact which may exhibit high thermal shock resistance and hardness, and improved fracture toughness without sacrificing resistance to chemical wear.

DESCRIPTION OF DISCLOSURE

Disclosed herein is a composite compact that may be free standing or may be bonded to a substrate such as WC. The compact comprises cBN, and ceramic materials having zirconia. The cBN may be in a range of about 5 to about 60 vol. %; and the other ceramic materials include one or more of nitrides, borides, and carbides of Ti, Zr, Hf, Al, and Si, and $Al_2O_3$. The zirconia may exist as cubic phase and/or tetragonal phase as detectable by X-ray diffraction (XRD).

The composite compact is manufactured by a high temperature/high pressure sintering process in the range of about 40 to about 60 kBar and about 1300 to about 1800° C. During the high temperature/high pressure process the Al may react with the zirconia, which leads to additional reactions resulting in the formation of additional phases that may include ZrN, ZrO, $ZrB_2$, and $TiB_2$.

As used throughout the following disclosure and claims, and unless otherwise stated, proportions of constituents listed in vol. % are based on the total vol. % of the compact.

BRIEF DESCRIPTION OF THE DRAWINGS

The following detailed description can be read in connection with the accompanying drawings in which like numerals designate like elements.

DETAILED DESCRIPTION OF EXEMPLARY EMBODIMENTS

Figure 1A:
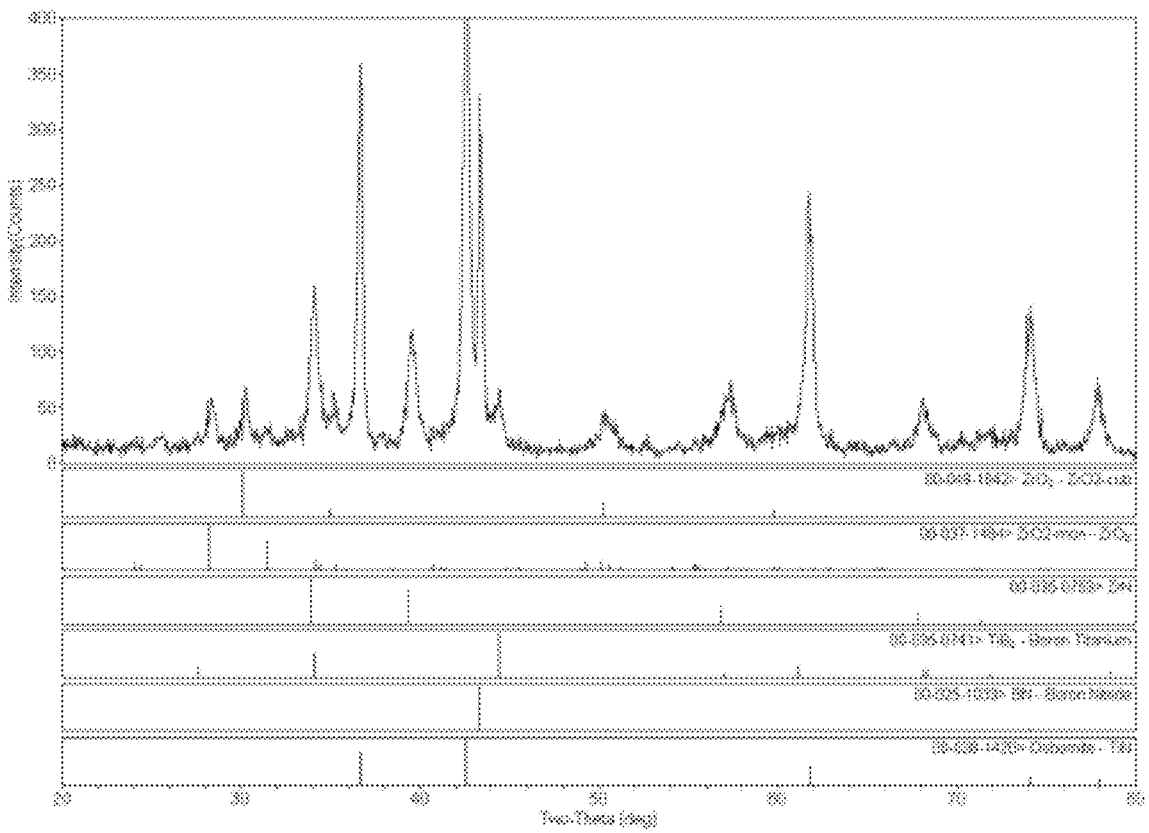
FIG. 1a shows an XRD pattern of Sample SM3-117B that is representative.

Disclosed is an improved cBN/ceramic compact which is useful, for example, in the machining of hard steels or CGI. The improved compact includes, among other improvements, greater impact toughness and reduced chemical wear, without sacrificing wear resistance. Those improvements are at least partially attributable to the combination of low cBN content i.e., about 10 to about 60 vol. % (sometimes less than about 50 vol. %, or sometimes less than about 40 vol. %); and the ceramic materials having zirconia. Suitable ceramic materials include nitrides, borides, and/or carbides of Group IV elements (e.g., nitrides of Ti, Zr, Hf), and $Al_2O_3$ or $Si_3N_4$. Also, the elements Al and/or Si would each be provided in the range of about 2.5 to about 15 vol. %, or about 5 to about 10 vol. %. The nitrides or carbides can be mixed carbonitrides such as TiCN or they may be substoichiometric such as $TiN_{0.72}$. The nitrides may be formed in situ. The nitrides, carbides, and/or borides may be added prior to the sintering or may be formed by reactions during sintering.

A single substance of zirconia may be used, i.e., unstabilized zirconia (98-99.9% pure) in the monoclinic phase. By "unstabilized zirconia" is meant zirconia that is free of stabilizing agents that would allow phases other than monoclinic, such as cubic, tetragonal, or orthorhombic (see FIG. 2) to be present at room temperature and pressure. The monoclinic phase is the thermodynamically stable phase of $ZrO_2$ at room temperature and pressure. Alternatively, zirconia stabilized by a stabilizing agent such as oxides of Ba, Ca, Ce, Hf, Mg, Sc, Sr, Y, and Yb may be used, especially if the sintering process is modified, as explained hereafter.

The zirconia present in the sintered compact includes zirconia in cubic, tetragonal or monoclinic or other phases, each such phase being about 0 to about 100 vol. % of the zirconia. In particular, the monoclinic and cubic phases may be frequently detected in the formulations tested.

The amount of zirconia may be determined by X-ray diffraction which allows the calculation of the amount of different phases of zirconia, as well as the amount of other crystalline substances, such as TiN, ZrN, and TiCN. Alternative techniques suitable for determining the amount and phases of crystalline zirconia and other substances include SEM (scanning electron microscope) in conjunction with EDAX (energy dispersion X-ray analysis), or TEM (transmission electron microscopy) in conjunction with selected area electron diffraction (SAED).

Experimental Procedure: $ZrO_2$ (99.9% purity, $D_{50}$ 0.3-0.7 μm) and YSZ ($ZrO_2$ with 3 mol % yttria, 99.9% purity, $D_{50}$<0.5 μm) were obtained from Inframat Advanced Materials and $HfO_2$ was obtained from Alfa Aesar. Blending may occur either in an attritor mill (Union Process HD01) or through ultrasonic mixing and mechanical stirring in dry isopropanol. For a typical attritor milled formulation, a 500 mL capacity milling jar was charged with 7 kg of milling media (e.g., tungsten carbide ¼" diameter spheres), 250 g of the powders to be milled (zirconia, cubic boron nitride, titanium nitride, aluminum, or silicon), and 250 g of dry isopropanol. The specific formulations prepared by milling, which included either unstabilized zirconia or yttria-stabilized zirconia (YSZ), are listed in Tables 1-2. The cBN particle size was 2-3 μm. Attritor milling was accomplished in 15 minutes at 200 rpm after which the slurry was air dried in an oven (100° C.) for several hours before sieving to remove the milling media. Ultrasonic mixing was for 60 minutes and then air drying in an oven (100° C.) for several hours. Table 3 lists formulations prepared by ultrasonic mixing.

Table 4 lists formulations that were spray dried prior to HPHT sintering according to the description of U.S. Pat. No. 6,287,489 B1.

Sintered materials were produced by loading powder into cups that had been fabricated from a refractory metal and capping with a tungsten carbide disc that fits snugly within the opening diameter of the cup. These cups were then assembled into a high pressure cell with an integrated heating circuit, and pressed on a uniaxial belt type apparatus, as generally (or basically) described for example in U.S. Pat. No. 2,941,248. Alternatively, powders were loaded into graphite containers which were then assembled into a high pressure cell. Two qualitatively different pressing cycles were used: A) both pressure and temperature were ramped up in less than 5 minutes, for example, to the soak pressure and temperature and held for approximately 30 minutes before releasing, or B) first pressure was ramped to about 75% of the soak pressure and held for less than 5 minutes, for example, during this pressure holding time, the temperature was ramped to about 75% of the soak temperature and held for less than 5 minutes, for example, during the temperature hold time, the pressure was ramped to 100% of the soak pressure and then the temperature was ramped to 100% of the soak temperature. The sintered blanks were finished by grinding, and tools (cutting inserts) were cut by wire electrical discharge machining (EDM) or by laser cutting. Machining tests were done on 52100 through-hardened steel, compacted graphite iron, or 8620 case-hardened steel in continuous or interrupted cut as described below.

X-ray diffraction (XRD) was performed on the inserts while being spun at 30 rpm, on a Bruker D8 instrument equipped with a solid state detector (Sol-X) using Cu Kα radiation generated at 40 kV and 40 mA. The measured XRD was then compared to standard XRD patterns from the JCPDS (Joint Committee on Powder Diffraction Standards)

database to identify the phases present. A phase was determined to be present if there was a match between the standard and measured pattern of the peak positions and relative intensities of the peaks. Relative quantities of phases were determined by measuring the area under selected peaks for relevant phases. For example, the (111) peak of cubic phase $ZrO_2$, appearing at ~30° in 2-theta, the ($\bar{1}$11) peak of monoclinic $ZrO_2$, appearing at ~28° in 2-theta, and the (200) peak of ZrN, appearing at ~39.5° in 2-theta, were used to determine relative quantities of these phases. The area under the peaks in the measured pattern was determined by using the Jade™ software package for viewing and analyzing X-ray diffraction data.

(1) Wear resistance test—8620 case-hardened steel: Wear resistance was evaluated on 8620 steel with a surface hardness range of HRc 55-63. Constant surface speed of 656 sfm (200 m/min.), 0.008 ipr (0.2 mm/rev) feed rate and 0.006" (0.15 mm) depth of cut were maintained. Flank wear on the inserts was measured after every pass. Tests were terminated once the flank wear reached a set wear limit of 0.008" (0.2 mm) or chipping of the edge occurred. Tool life was defined as the time required attaining the set wear limit or chipping of the cutting edge.

(2) Impact toughness test—52100 steel, HRc 60: Impact resistance (toughness) was determined by interrupted facing on 52100 steel, with HRc 60. The interruption was provided by a 0.400" (10 mm) wide×0.840" (21 mm) deep slot in the work piece. A constant surface speed of 394 sfm (120 m/min.) was maintained, while depth of cut and feed rate were incrementally increased. The criterion of failure was a chipped cutting edge. If the insert had failed, then that feed rate was determined to be the failure feed rate.

(3) Wear resistance test—compacted graphite iron (CGI) test cylinders were obtained from SinterCast. Turning tests were performed with constant surface speed of 1200 SFM, a 0.020" depth of cut, and 0.010 ipr feed rate using coolant (5% Trim E206 Soluble Oil). Flank wear was measured after every pass. Tests were terminated once the flank wear reached 0.008" or chipping of the edge occurred.

Significant differences occurred between the samples formulated with YSZ (1A, 1C, and 2A) versus those formulated with unstabilized zirconia, under sintering cycle A. In all formulations with YSZ, the sinter quality was exceedingly poor, such that the blank was riddled with cracks, delaminations, and pits. Due to these limitations, tools using these materials were not made. Tests for machining performance were not conducted. Despite these obvious differences, the XRD patterns of samples formulated with YSZ and samples formulated with unstabilized zirconia were remarkably similar. Better results using YSZ were obtained when sintering cycle B was used. It is theorized that the initial pressurizing/heating allows phase transformations of the YSZ to complete before proceeding with full pressure sintering (ca. 40-50 kBar, for example).

FIG. 1a shows the XRD pattern for sample SM3-117B, which is representative. The measured X-ray diffraction pattern is at the top. Below it are six standard patterns taken from the JCPDS database. The unique number identifying each standard pattern is also given in the figure. The JCPDS patterns are idealized diffraction patterns for each phase. For example, the upper strip indicates the cubic phase of zirconia. Each vertical line on that strip corresponds to an idealized diffraction peak of that phase and the vertical height of each line corresponds to the intensity expected for each diffraction peak. It will be appreciated that there is a peak on the measured diffraction pattern that corresponds to each of the vertical lines, so it can be said that the cubic phase of zirconia exists in that material. It is evident from the strips that in addition to cBN, and TiN, two phases of $ZrO_2$ as well as ZrN and $TiB_2$ are detected. The two phases of $ZrO_2$ present in the sintered blank are monoclinic and cubic. Considering only the $ZrO_2$ and ZrN phases, analysis of the XRD pattern reveals that cubic and monoclinic $ZrO_2$ are about 20% each, for example, while the remainder, about 60%, for example, is ZrN.

Figure 1B:
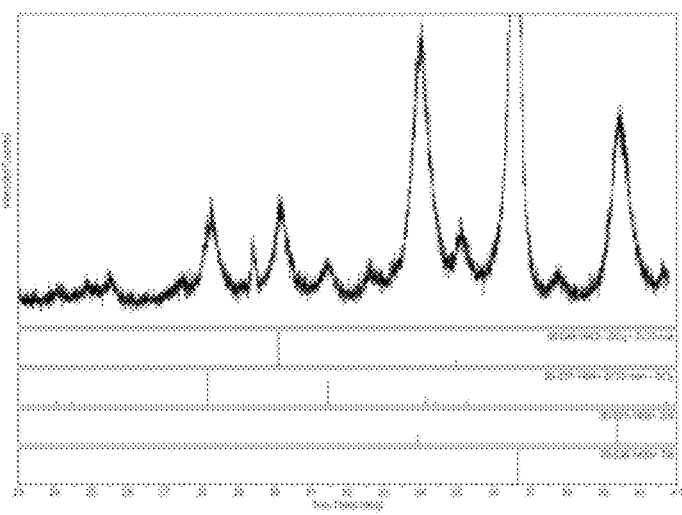
FIG. 1b shows greater detail of this XRD pattern and gives the patterns used in phase identification and quantification.

FIG. 1b shows a more detailed view of the XRD pattern in the range 23 to 41 degrees in 2-theta. The most intense peaks used for quantification of the $ZrO_2$ and ZrN may be seen on the reference patterns given. The reference pattern for monoclinic $ZrO_2$ (mineral name Baddeleyite) is also given. It will be appreciated that the monoclinic and cubic phases of $ZrO_2$ are present in roughly equal amounts, because the corresponding peaks in the measured XRD pattern are about equal in height and width.

Figure 2:
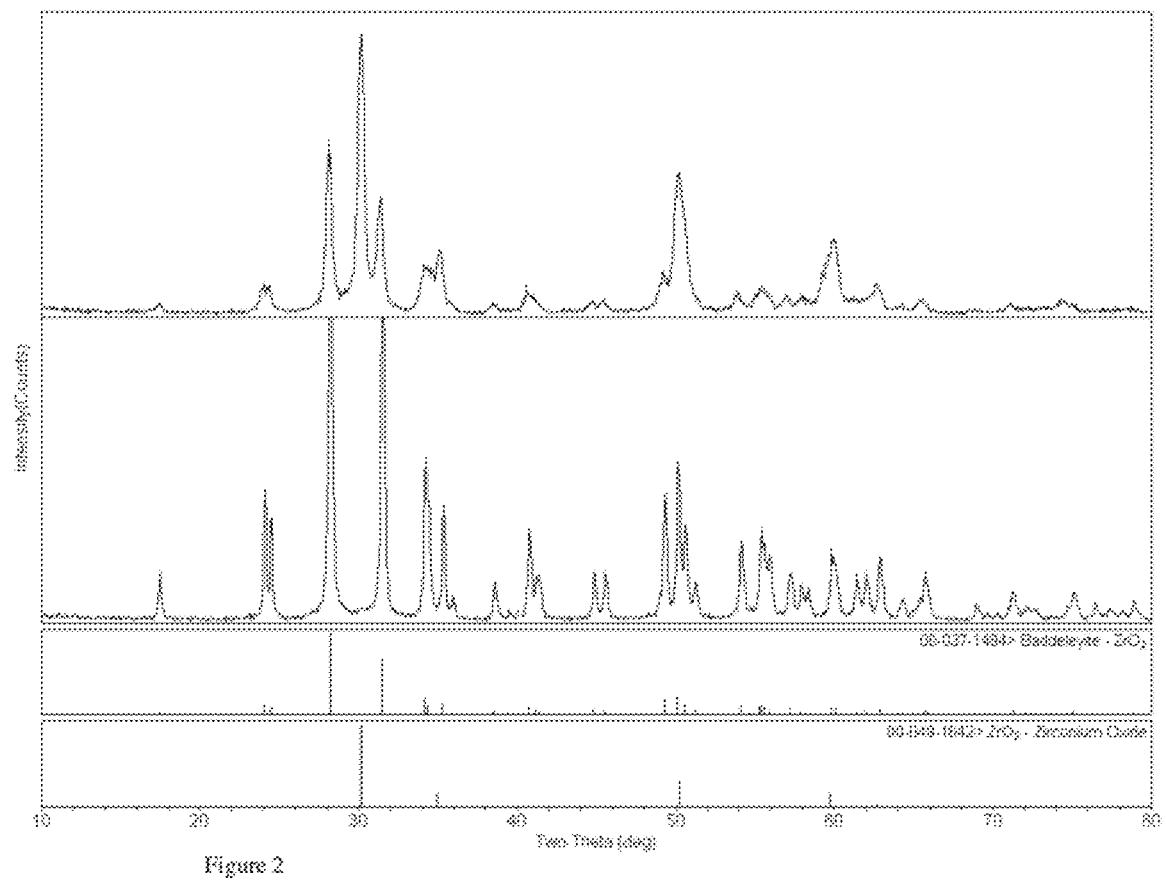
FIG. 2 shows the XRD patterns of YSZ (top) and unstabilized $ZrO_2$ (bottom) that was used in the sample formulations.

As shown in FIG. 2, both monoclinic and cubic phases were present in the YSZ but only the monoclinic phase is present in the un-stabilized $ZrO_2$ used in these formulations. It is apparent that after sintering, some portion of the monoclinic phase is transformed. It is also evident that some reaction occurred as well to form ZrN and $TiB_2$ because these two phases were not initially present in the powder prior to sintering. Taking account of all the starting ingredients, and not wishing to be bound by theory, a possible reaction to produce this material would be:

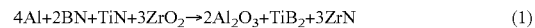

$$4Al+2BN+TiN+3ZrO_2 \rightarrow 2Al_2O_3+TiB_2+3ZrN \qquad (1)$$

No N was added as an ingredient, but some of the zirconia became ZrN in the compact during the reaction. Although $Al_2O_3$ is not conclusively detected in the XRD pattern, its presence as an amorphous or poorly crystallized material cannot be ruled out and may theoretically be present considering the chemistry of these materials.

Figure 3:
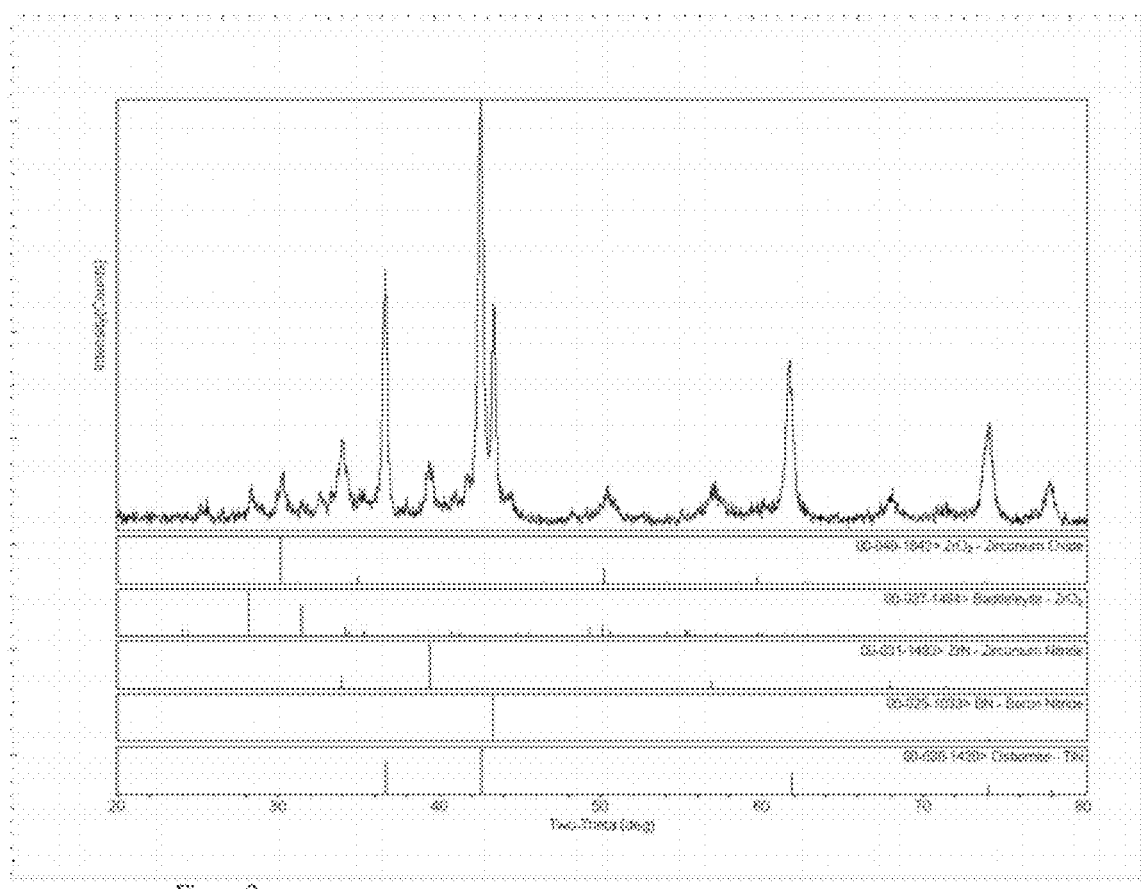
FIG. 3 shows the XRD pattern of sample SM3-117D that was tested.

FIG. 3 shows the XRD pattern for sample SM3-117B. The pattern is very similar to that of sample SM3-117A and the reaction products are similar. Analysis of the XRD pattern (similar to the analysis for sample 117A) reveals proportions of cubic and monoclinic $ZrO_2$ and ZrN similar to that found in sample 117A. However, the $ZrO_2$ used in this formulation was the un-stabilized form and is, according to XRD (FIG. 2) entirely the monoclinic phase prior to sintering. Thus, although the XRD data of these two samples are quite similar, the sintering behavior is very different.

Samples 117C and 117D were identical in formulation to 117A and 117B respectively. They showed similar sintering behavior and their XRD patterns were nearly identical. The lower sintering temperature did not improve sample 117C over 117A but did yield a somewhat more robust ceramic in the case of sample 117D.

Figure 4:
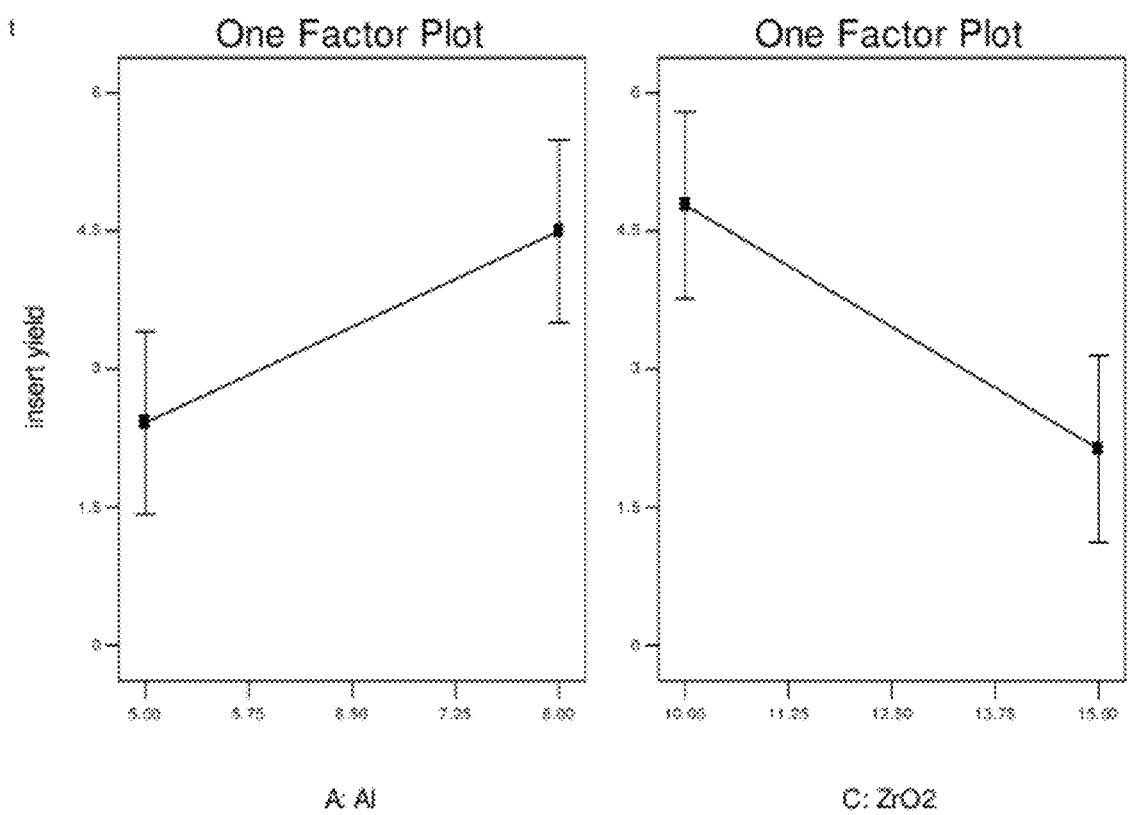
FIG. 4 shows a designed experiment analysis of the effect of Al and $ZrO_2$ in the formulation on the sinter quality.

Samples SM3-123-1 through 14 were formulated with un-stabilized $ZrO_2$ and form a set of designed experiments. The HPHT sintered materials were examined for sinter defects such as cracks and/or pits. These observations were quantified and used to assess their sinter quality. The designed experiment analysis (FIG. 4) shows that increasing Al and decreasing $ZrO_2$ are beneficial to sinter quality.

Figure 5:
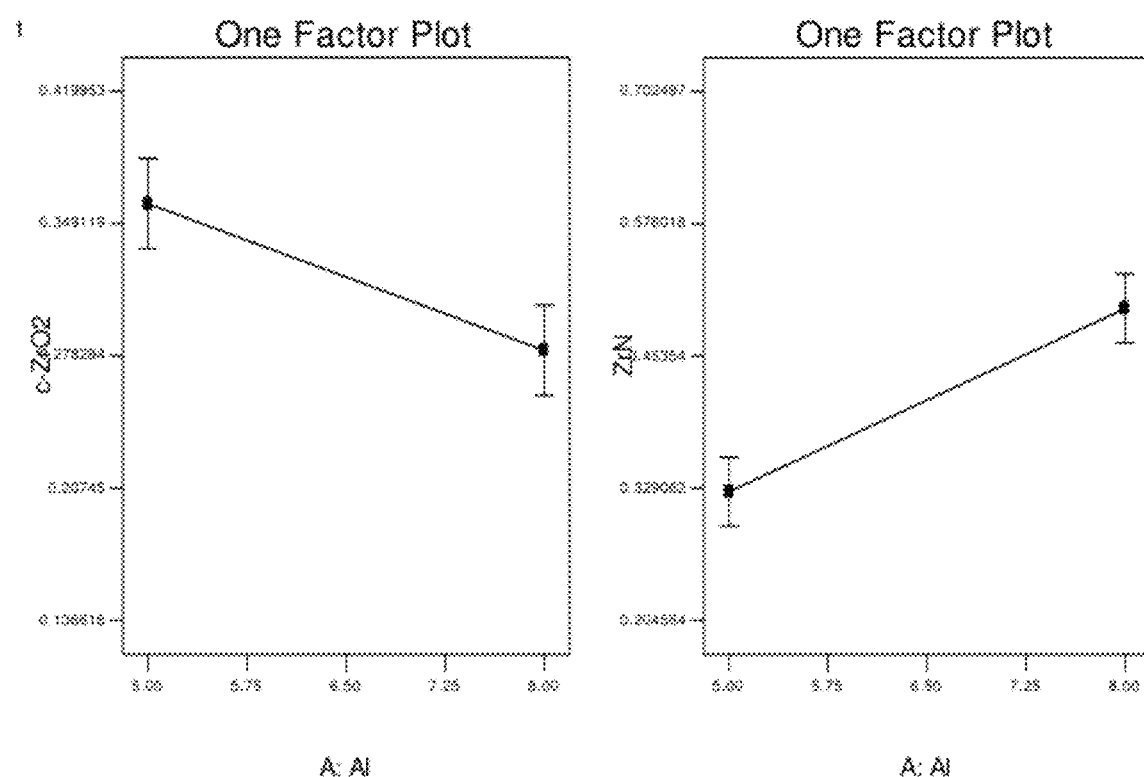
FIG. 5 shows a designed experiment analysis of the effect of Al on cubic $ZrO_2$ and ZrN formation.

Another designed experiment analysis (FIG. 5) relating the amount of cubic phase $ZrO_2$ and the amount of ZrN, as determined by XRD, to the amount of Al in the formulation showed that increasing Al content decreased cubic phase $ZrO_2$ and increased ZrN content. This outcome may be understood in terms of the chemical equation given above (Eqn. 1). Increasing Al content may lead to consumption of $ZrO_2$ and its conversion to ZrN.

Figure 6:
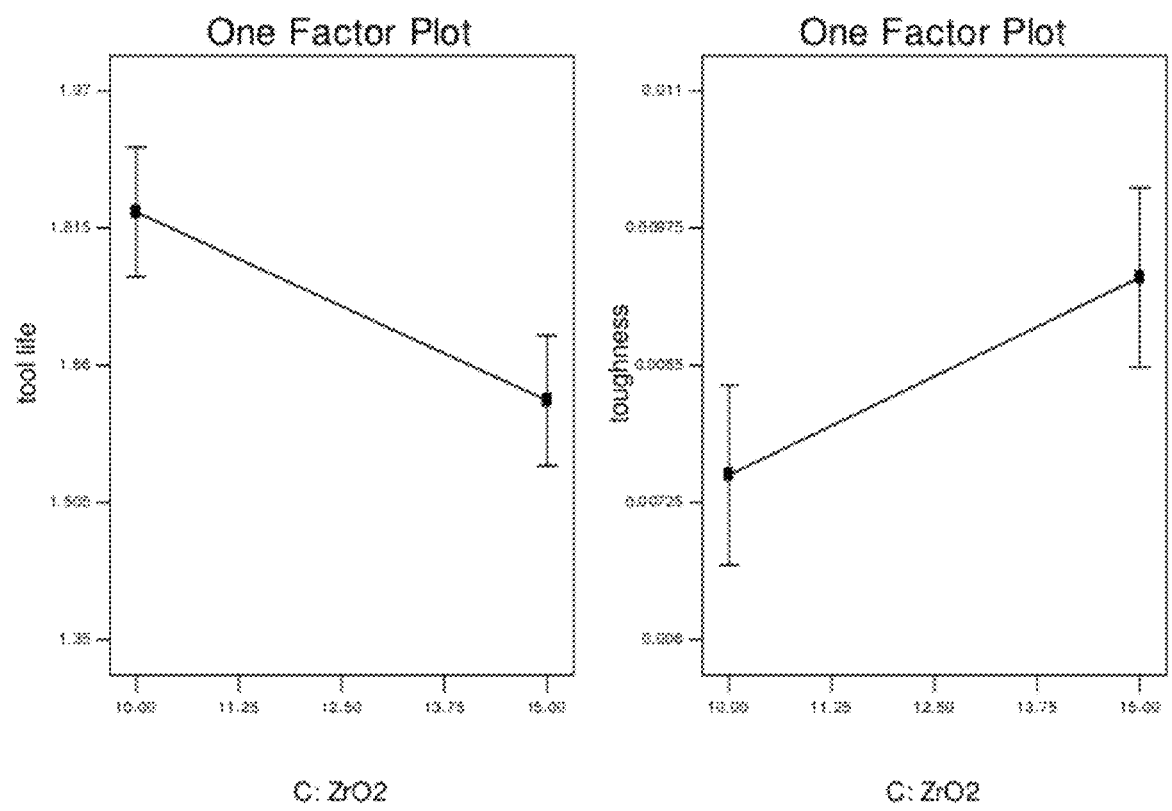
FIG. 6 shows a designed experiment analysis of the effect of $ZrO_2$ on tool life and tool fracture resistance.
Figure 7:
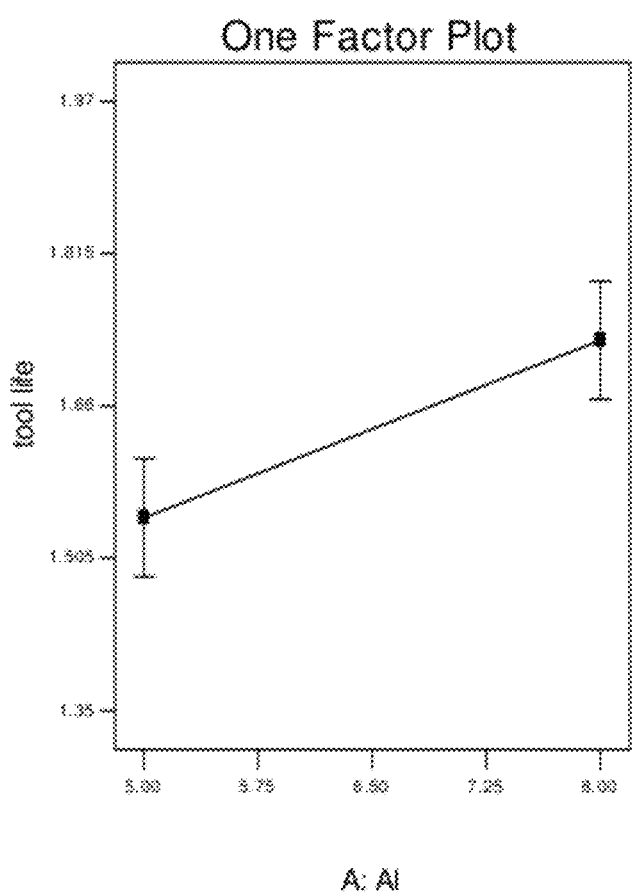
FIG. 7 shows a designed experiment analysis of the effect of Al on tool life.

Tests were run on sample set SM3-123 as described in paragraph [51] and [52] to assess the effect of $ZrO_2$ content on tool performance. The results, shown in FIG. 6, indicate that toughness increases with $ZrO_2$ content, but that tool life decreases. Another factor in tool performance is Al content. As shown in FIG. 7, tool life increases with increasing Al content.

Figure 8:
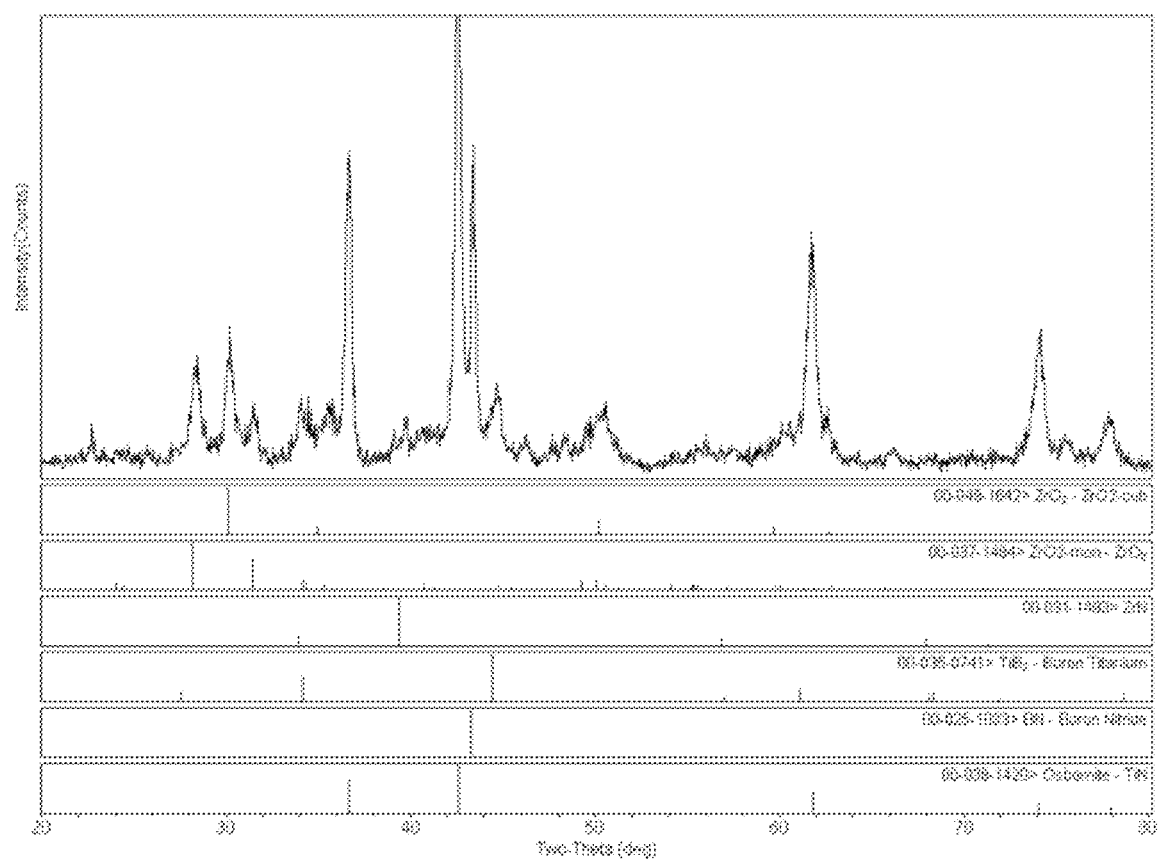
FIG. 8 shows the XRD pattern of sample SM3-118B that was tested.

Samples SM3-118A and SM3-118B were formulated with Si instead of Al and sintered under the same conditions as samples 117C and 117D. Similar to what had been observed before, the sinter quality of 118A (containing YSZ) was very poor. The XRD pattern of sample 118B is given in FIG. 8. Both cubic and monoclinic forms of $ZrO_2$ are detected, but no ZrN. This may suggest that Al is required to form ZrN and gives further support to the validity of Equation 1 hypothesized above.

Figure 9:
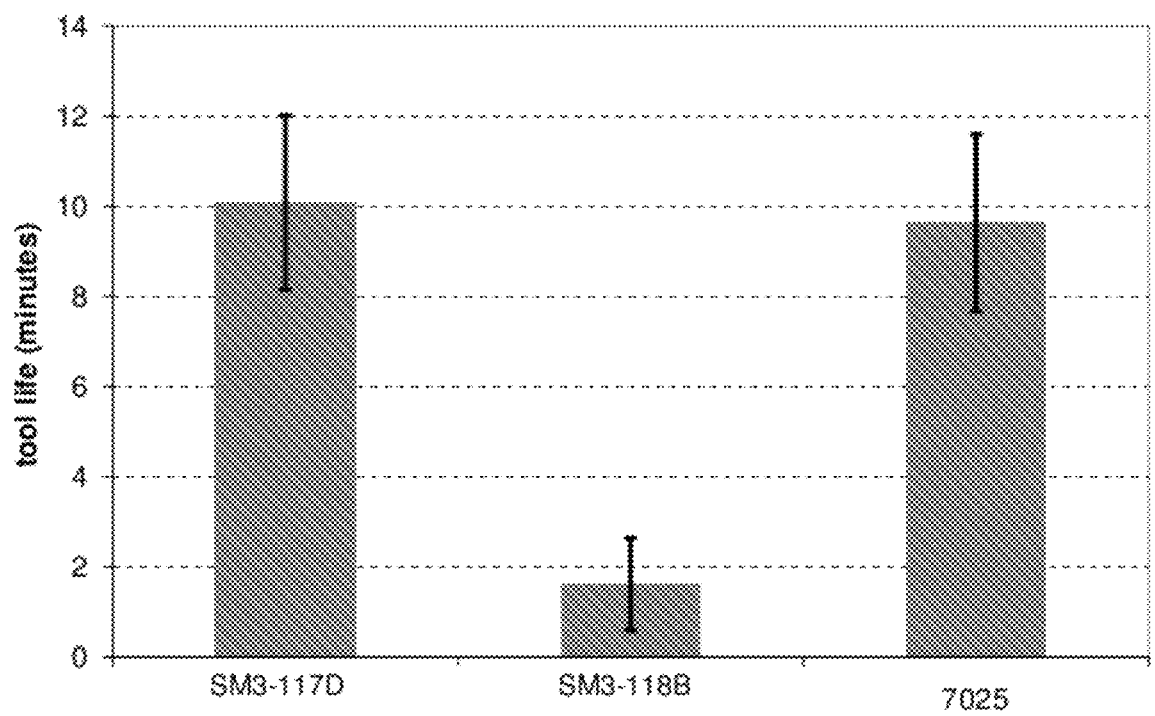
FIG. 9 is a bar graph showing the impact toughness of samples SM3-117D and SM3-118B and a commercial product, Sandvik Grade 7025.

The impact toughness test (FIG. 9) for these materials shows that sample 117D is much more robust than 118B. Also plotted in that figure is the impact toughness of a commercially available material, Sandvik AB's Grade 7025. This standard material contains 65 vol. % cBN, much higher than the content of 117D and 118B (<50 vol. %) along with TiN based ceramics. Higher cBN vol. % is normally associated with greater impact toughness, so it is expected that Grade 7025 would be a much tougher material. However, it appears that 1D is somewhat tougher, although still within the error range of the measurement.

Figure 10:
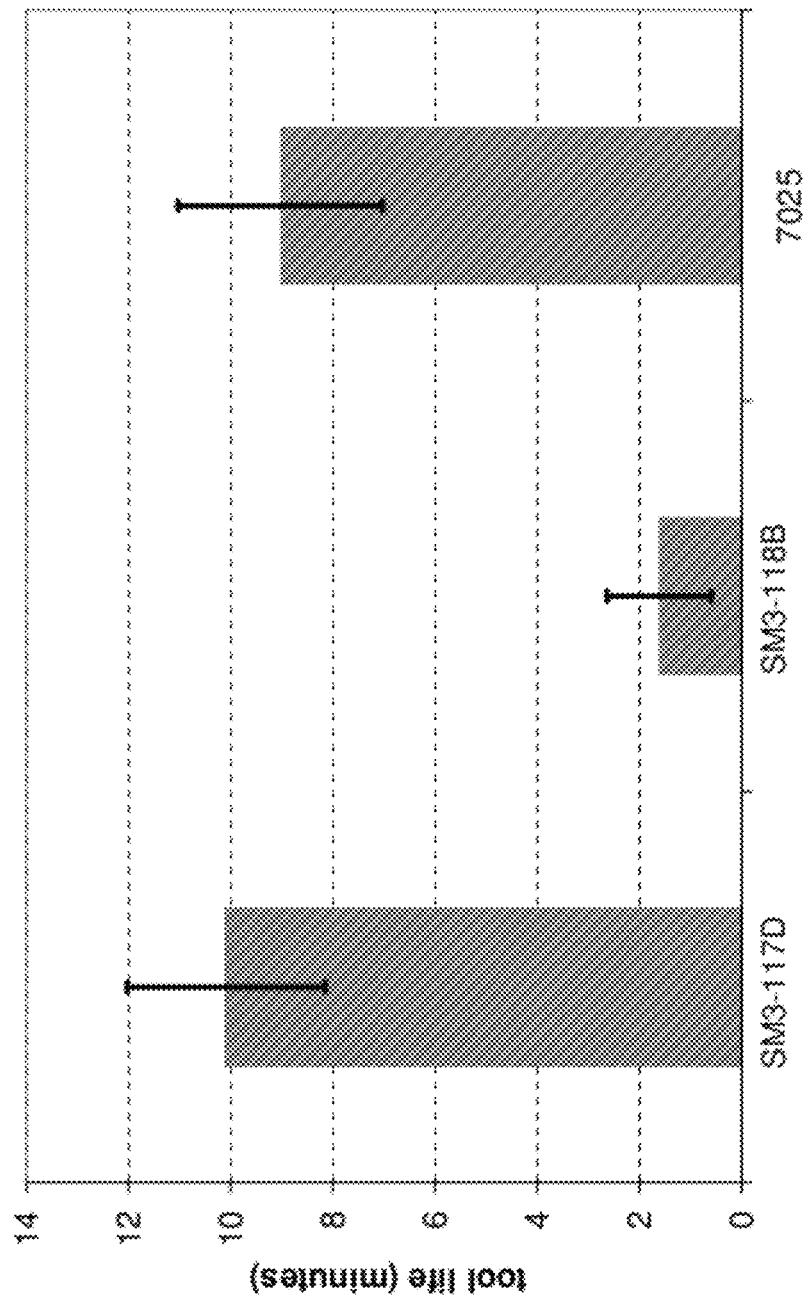
FIG. 10 is a bar graph showing the wear resistance of samples SM3-117D and SM3-118B and a commercial product, Sandvik Grade 7025.

The wear resistance test (FIG. 10) follows a similar pattern with 117D showing much greater performance than 118B. Sample 117D also appears to have measurably better performance than 7025, although still within the error range of the measurement. In this case, however, since wear is dominated by frictional heat at the cutting tip (chemical wear), one would expect the material with less cBN to offer better performance.

The relatively poor performance of sample 118B in both machining tests is likely attributable to the sinter quality of the material being poor and the lack of ZrN formation. Si was substituted for Al in the formulation but apparently did not react as readily to bind the ceramic components together during the sintering cycle. It is well known that Al is a highly reactive element, so this is not particularly surprising. However, in both sets of samples, the addition of YSZ resulted in poorly sintered material. That was quite surprising since YSZ is generally preferred in conventional ceramic sintering of zirconia containing ceramics.

That result may be due to the high pressure conditions employed being much more effective in converting zirconia to cubic and tetragonal phases. Also, under high pressures, the yttria contained in YSZ may no longer be soluble and may interfere with the sintering process.

A significant result of the testing is that sample 117D may possess fracture toughness that is at least equivalent to or greater than that of Grade 7025 even though the latter contains more cBN (65 vol. %). That high cBN content may yield a material with greater impact toughness, but with greater chemical wear. Thus, greater impact toughness was achieved at the expense of greater chemical wear.

But as seen in these results, the addition of zirconia may yield a paradigm shift in which PCBN with lower cBN content (less than about 50 vol. %, for example) can exhibit impact toughness equivalent to that of PCBN material having higher cBN content without an appreciable reduction in wear resistance.

Figure 11:
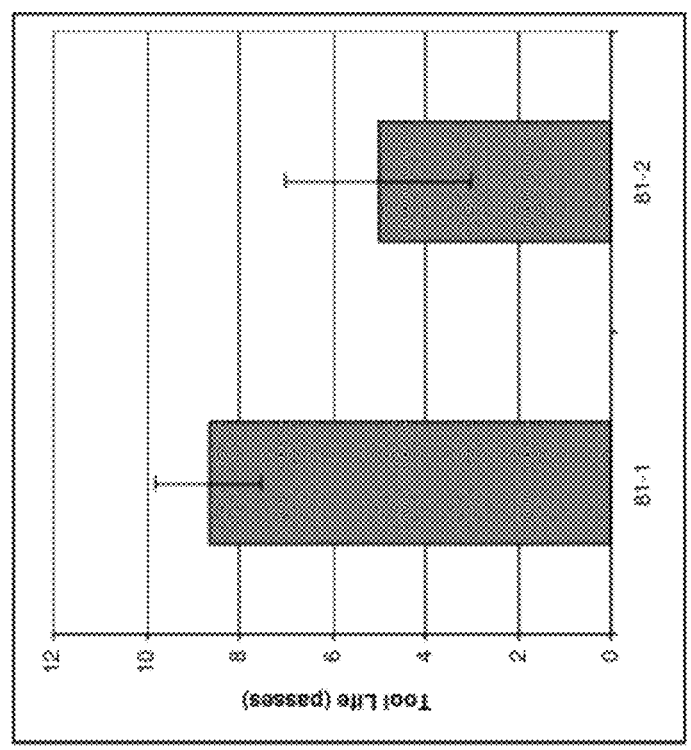
FIG. 11 is a bar graph comparing the impact toughness of samples 81-1 and 81-2, demonstrating toughening effect of $ZrO_2$.

The effect of $ZrO_2$ is further illustrated by the samples listed in Table 3, all of which (except 81-2 and 81-3) were made with un-stabilized zirconia. FIG. 11 shows impact toughness test results for samples 81-1 and 81-2. In this example, the addition of zirconia increased the toughness of the material even though the cBN content was decreased. Another key observation is that the variance also decreased with the addition of zirconia.

Figure 12:
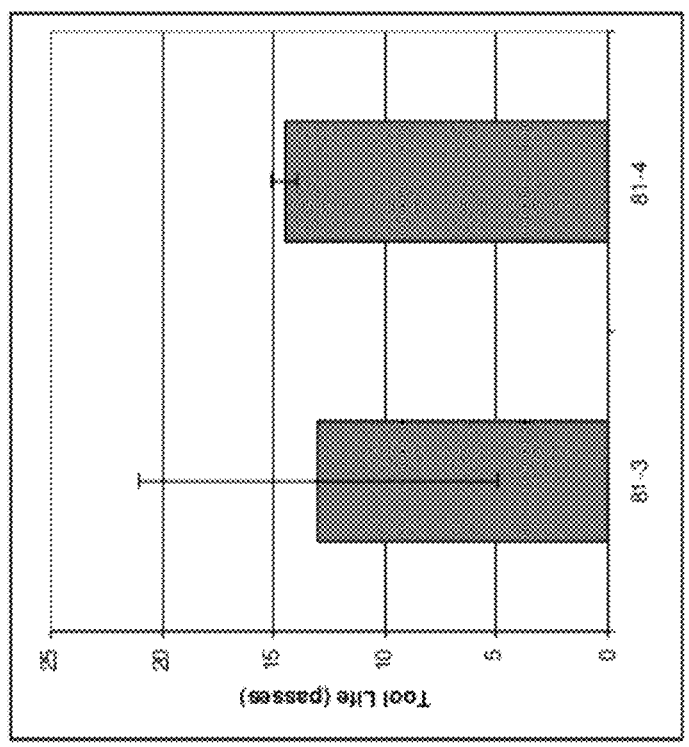
FIG. 12 is a bar graph comparing the impact toughness of samples 81-3 and 81-4, demonstrating the improved consistency with the addition of $ZrO_2$.

FIG. 12 compares data for 81-3 and 81-4. Again, with zirconia addition, toughness is increased, but even more strikingly, the standard deviation is much smaller with the addition of zirconia.

Figure 13:
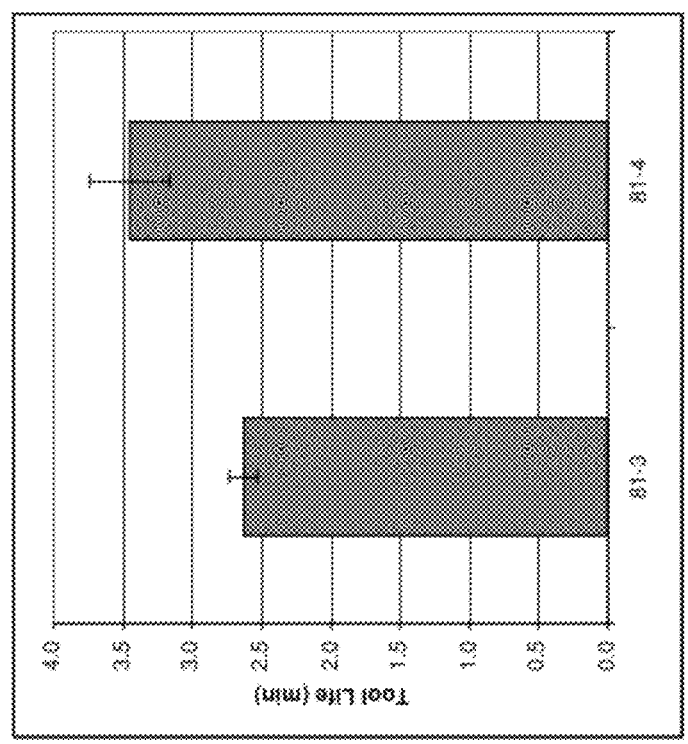
FIG. 13 is a bar graph comparing the wear resistance of samples 81-3 and 81-4, demonstrating increased wear resistance with the inclusion of $ZrO_2$.

FIG. 13 presents wear results for samples 81-3 and 81-4 in the CGI wear test (paragraph [52]). This test looks at wear under high temperature cutting conditions where chemical wear dominates. Tool life is increased by reducing the cBN content and increasing the content of more chemically stable components.

Figure 14:
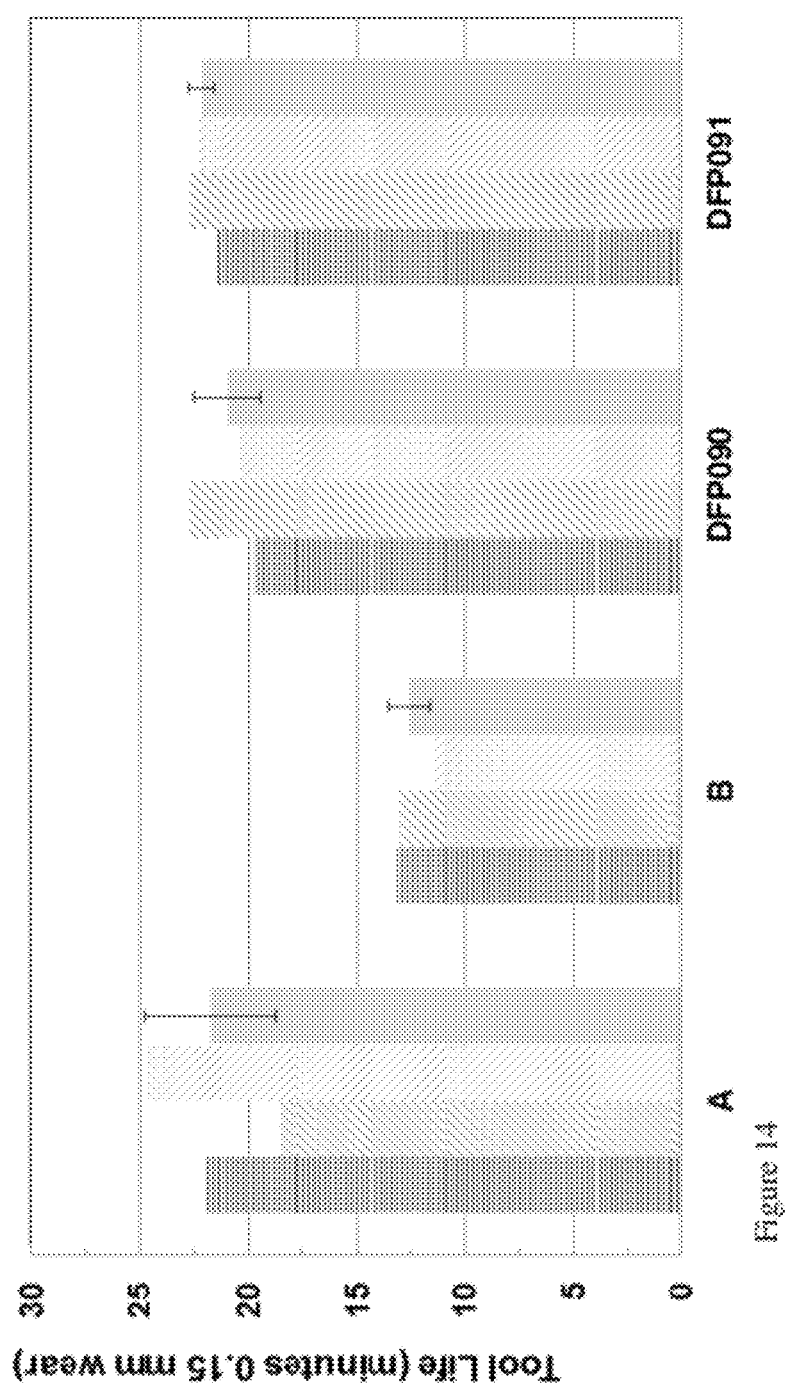
FIG. 14 is a bar graph comparing the wear resistance of samples DFP090 and '091 against standard tool materials.

Reducing variability in tool performance is important for practical applications and is demonstrated again in FIG. 14. Samples containing $ZrO_2$ (DFP090) and $HfO_2$ (DFP091) were fabricated as described previously (paragraph [47]). These were tested against standard PCBN tool materials that are currently available in the wear resistance test (paragraph [50]). As can be seen, both $ZrO_2$ and $HfO_2$ containing tool materials performed better than grade B and both are equivalent to grade A. However, the variation in performance is much less than that of tool A.

Figure 15:
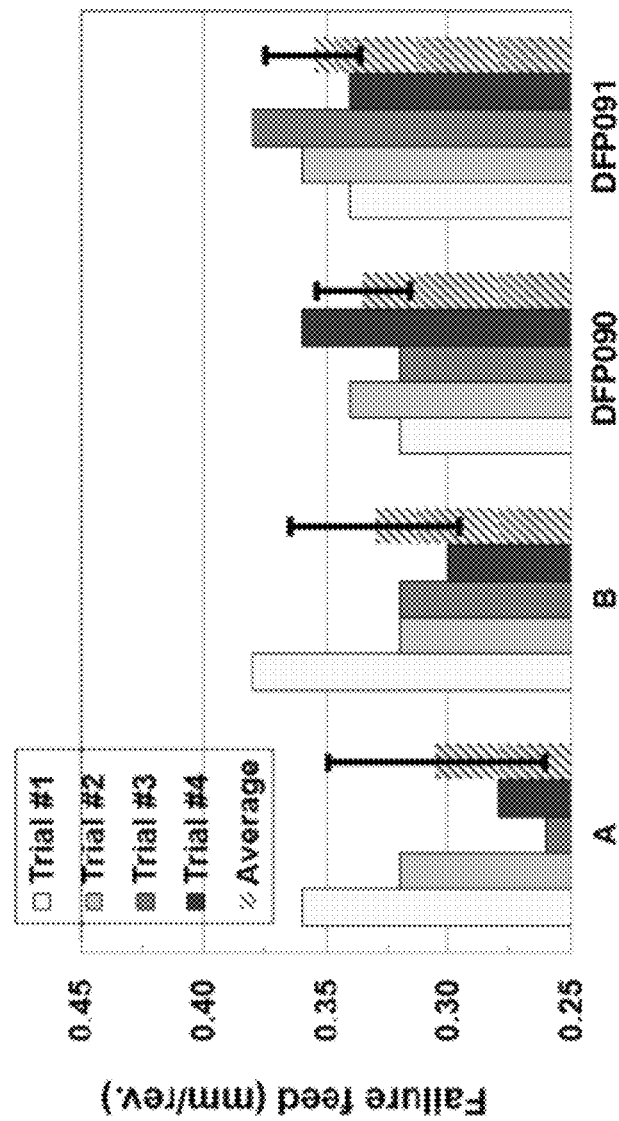
FIG. 15 is a bar graph comparing impact toughness of samples DFP090 and '091 against standard tool materials.

Tools were also tested in the impact toughness test (paragraph [51]). The results, plotted in FIG. 15, show that experimental materials were also tougher and with less variability in their performance.

Figure 16:
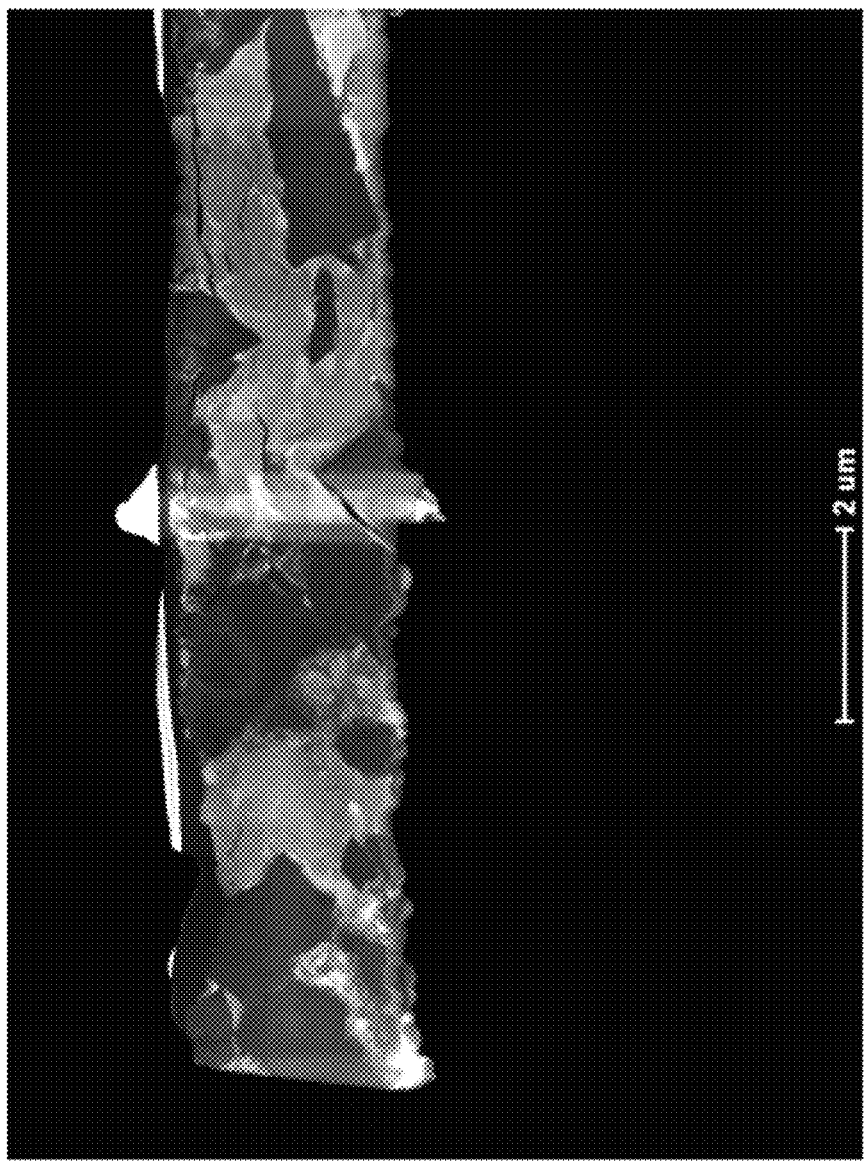
FIG. 16 is a transmission electron microscope (TEM) image of sample 123-2.
Figure 17:
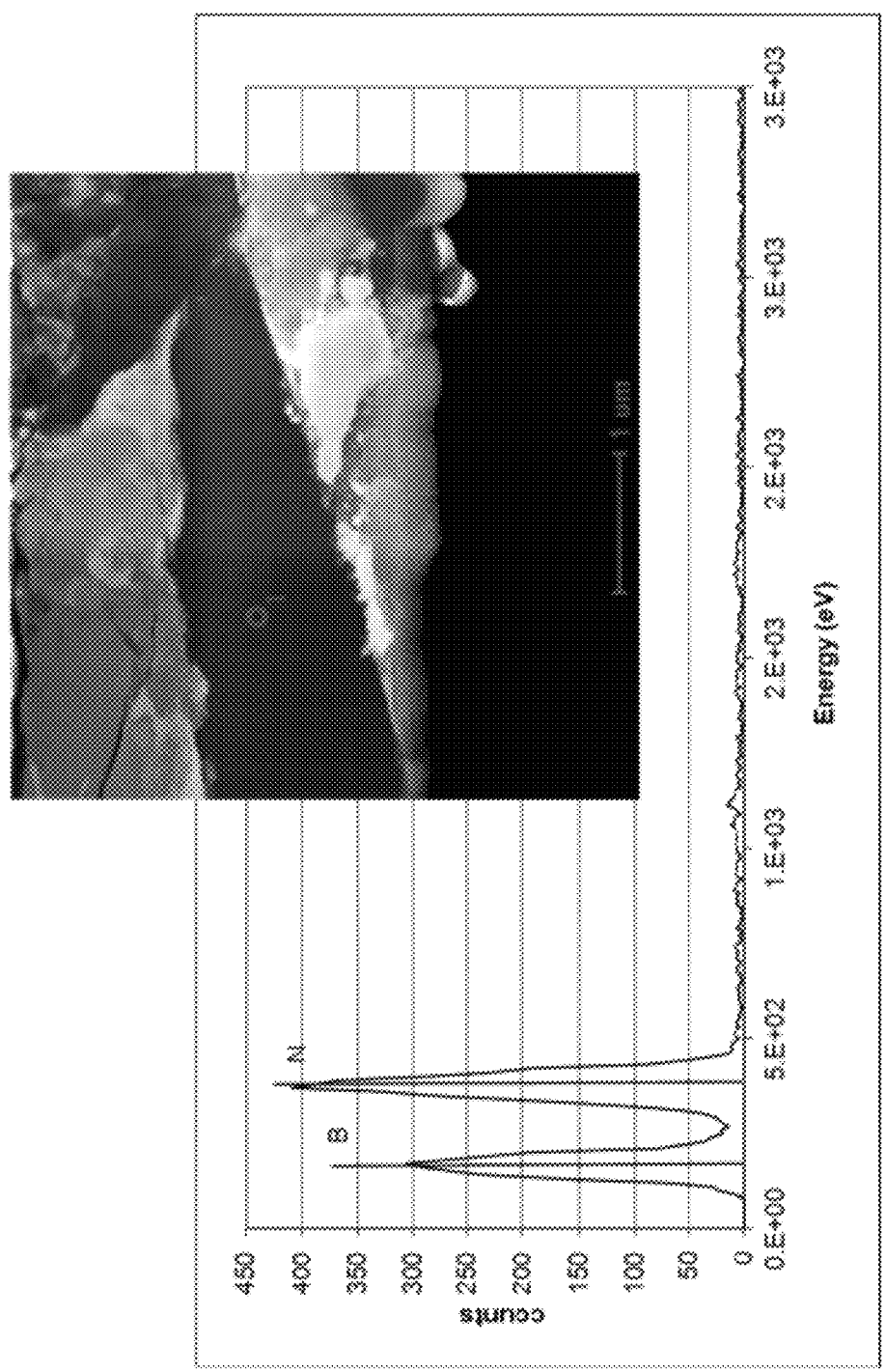
FIG. 17 is TEM image of sample 123-2 showing elemental analysis of the dark regions.
Figure 18:
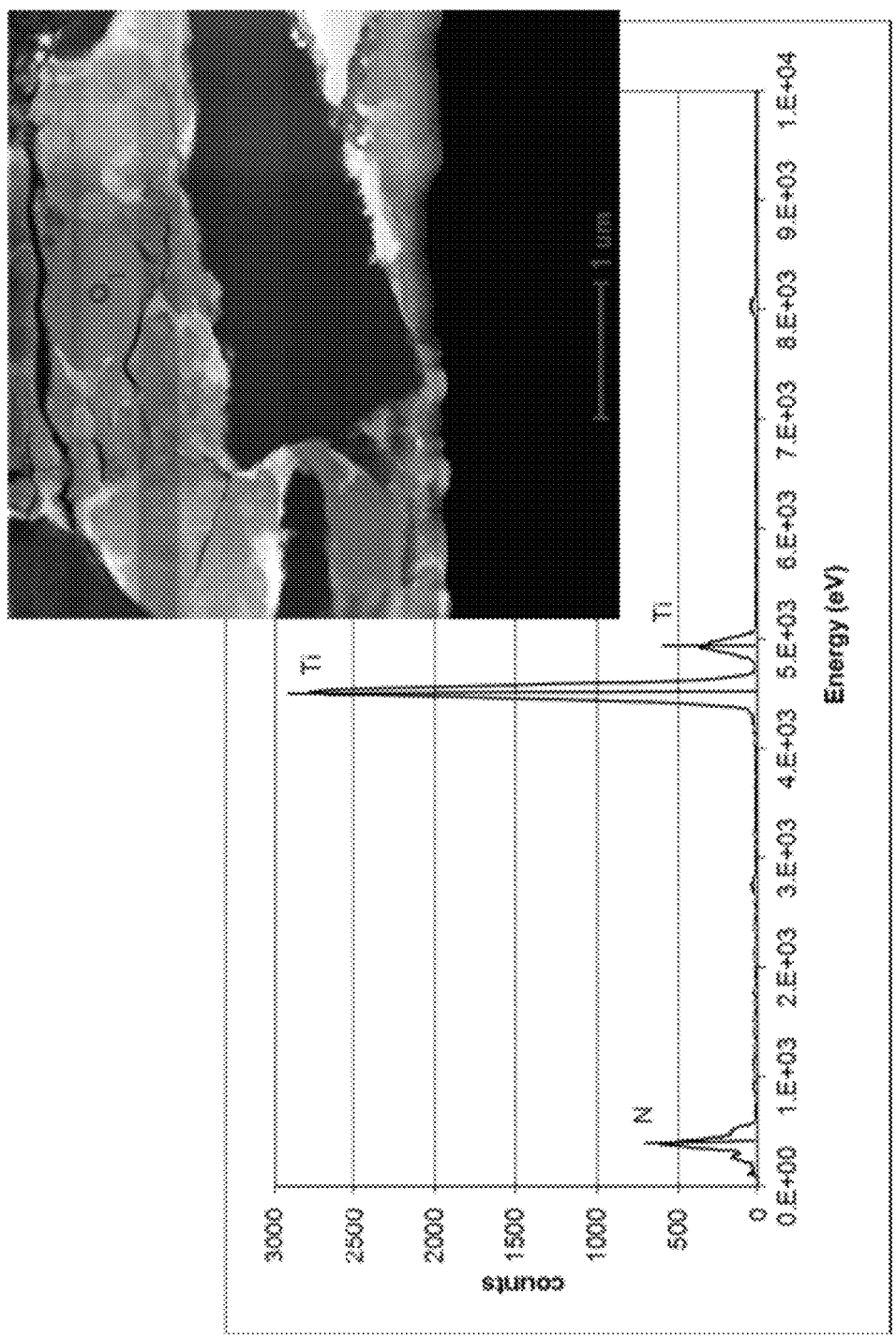
FIG. 18 is a TEM image of sample 123-2 showing elemental analysis of the gray region.
Figure 19:
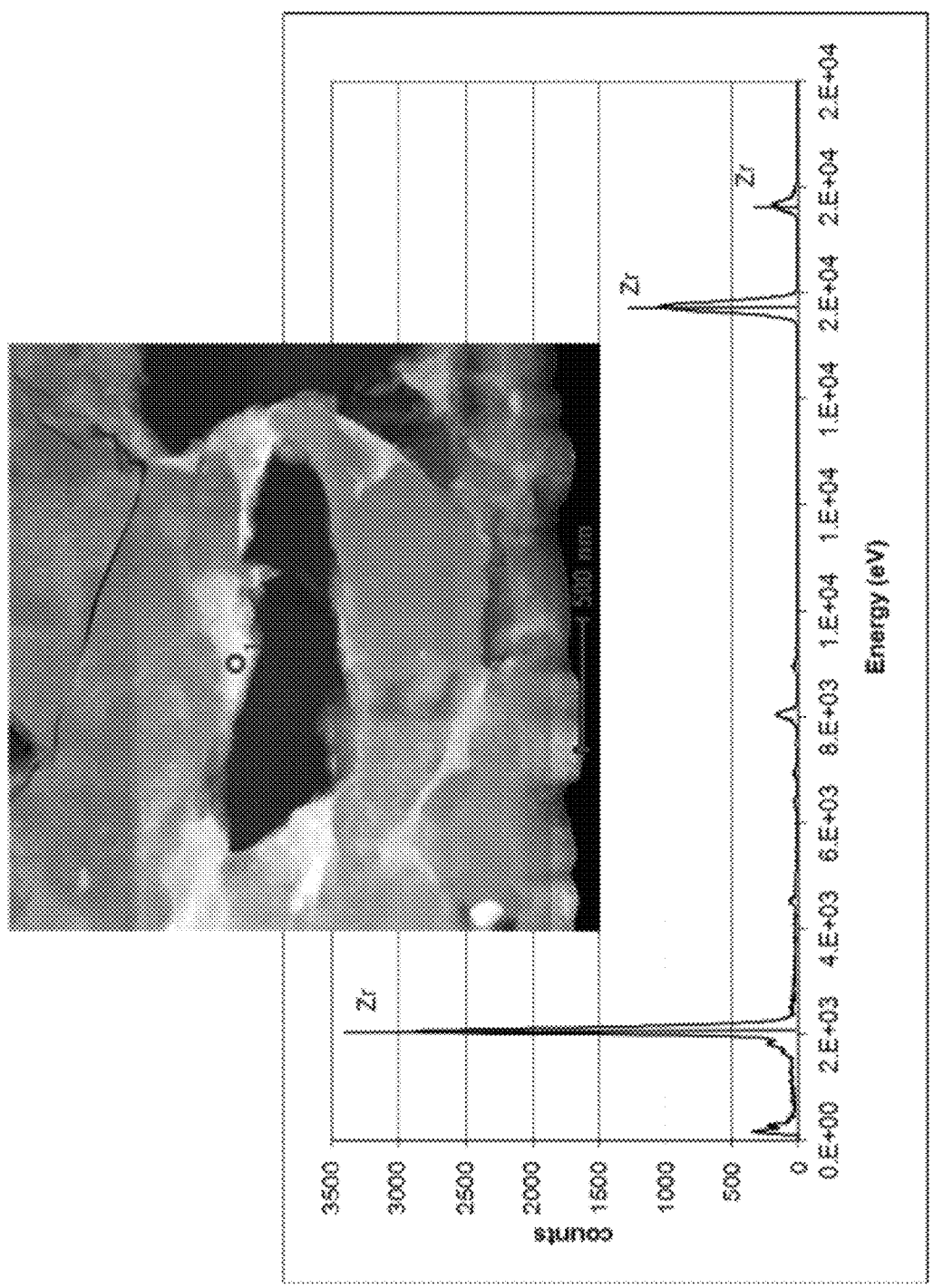
FIG. 19 is a TEM image of sample 123-2 showing elemental analysis of the light region.

TEM images of samples 123-2, 123-5, DFP090, and DFP091 have been done to elucidate the microstructure and provide explanations for the enhanced tool quality. FIGS. 16 through 19 show TEM images of sample 123-2. FIGS. 17 through 19 show elemental composition of the different areas in the sample. The analysis results support the conclusion that the black grains are cubic boron nitride (FIG. 17); while the gray areas are titanium nitride (FIG. 18). Analyses of the light areas (FIG. 19) show that they are zirconium with little else detected. It is also interesting that this light area occurs near a cBN grain. As shown in FIG. 16, it appears that these light regions tend to occur near the interface of cBN grains with the matrix. This supports the notion that there is a reaction (as suggested in Equation 1 above and Equations 2-4 below) between the ZrO2 and cBN during HPHT sintering.

Figure 20:
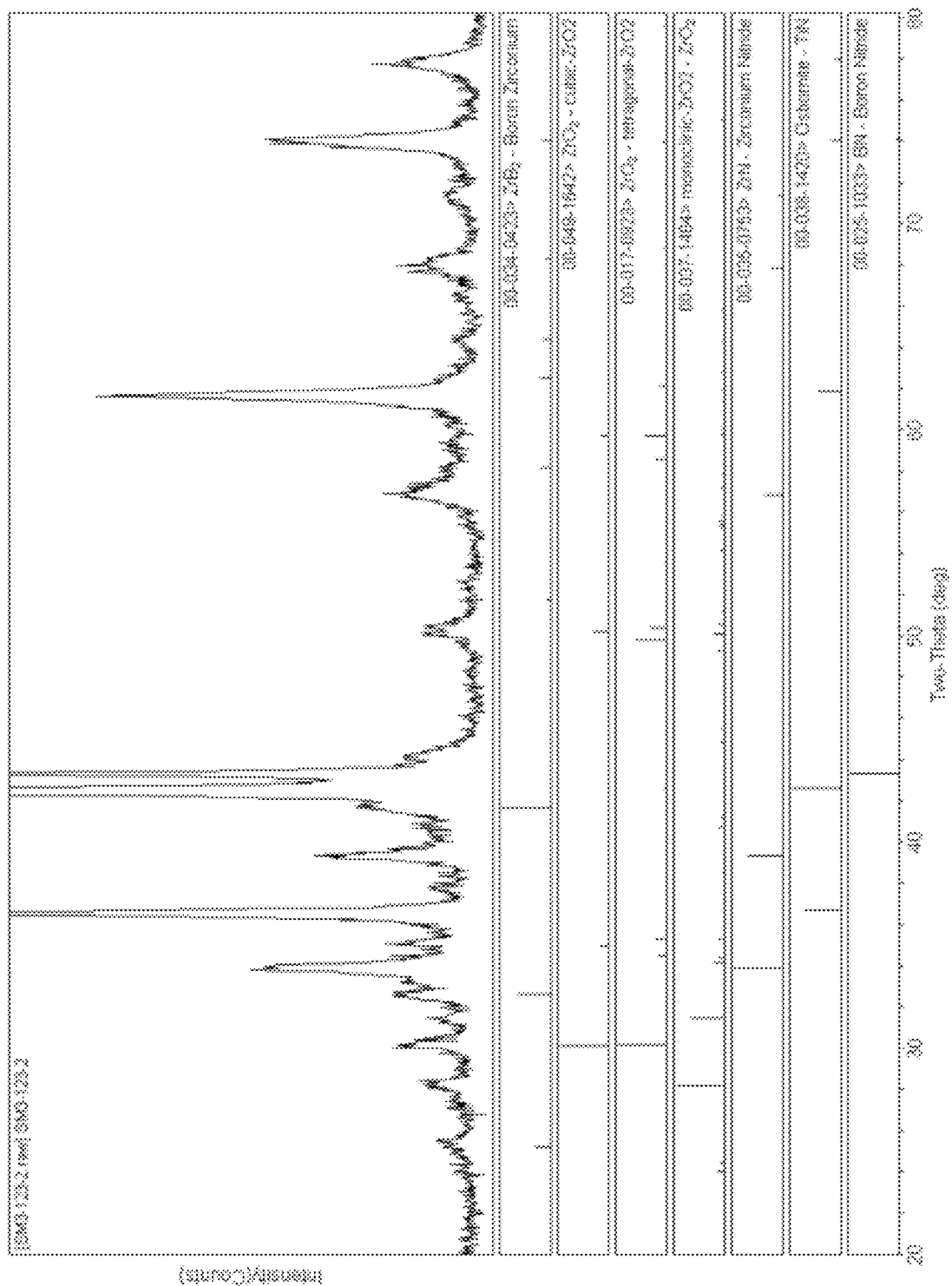
FIG. 20 is XRD spectra of sample 123-2.

Further support for this notion is provided by the X-ray diffraction pattern (FIG. 20), which shows that both cubic and monoclinic phases of $ZrO_2$ may be present. However, ZrN and $ZrB_2$ are also detected in significant quantities. Possible reactions that could lead to the formation of these species are given in paragraph [83].

Figure 21:
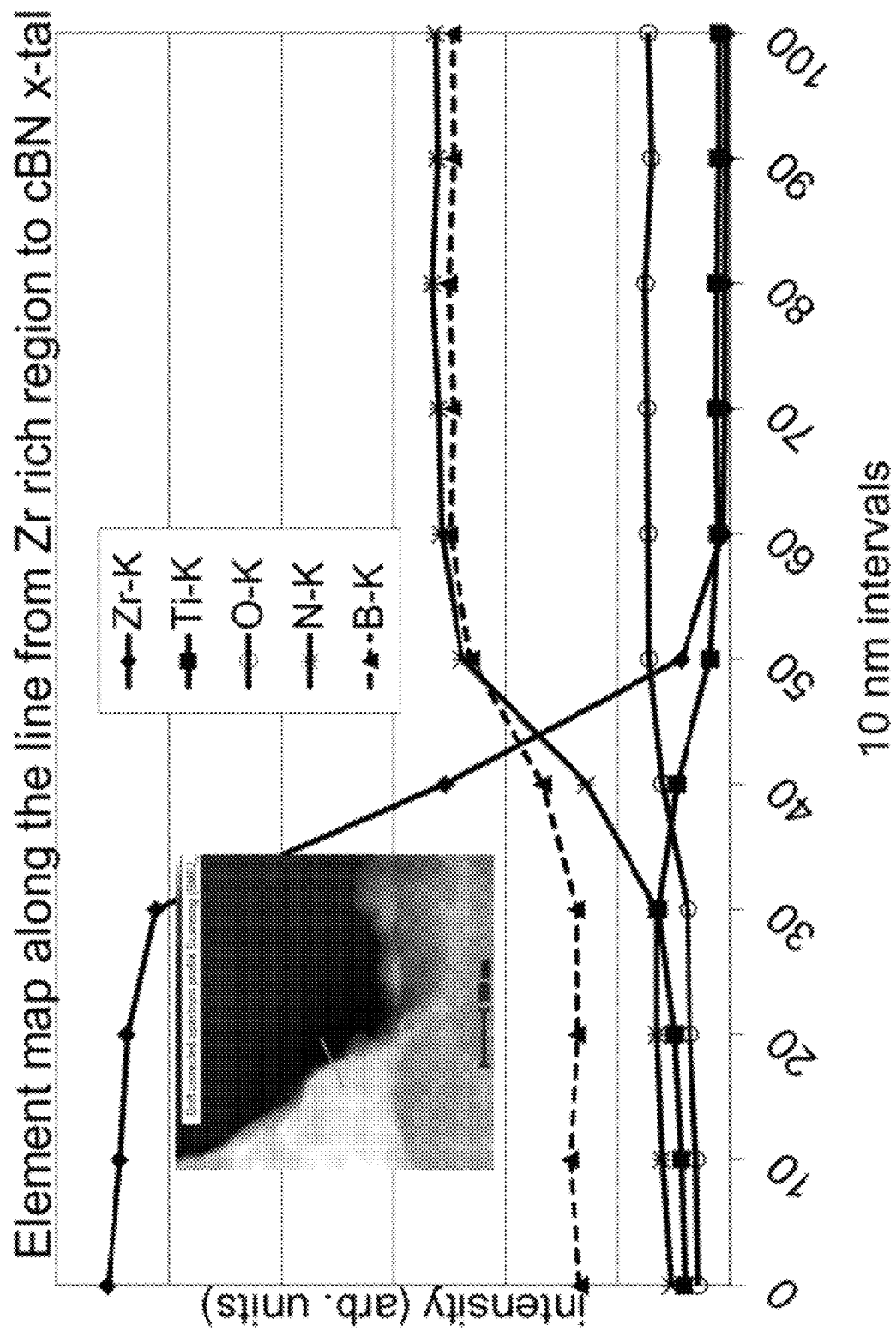
FIG. 21 is an elemental line scan of sample 123-2 done in the TEM showing the distribution of elements near the interface between regions.
Figure 22:
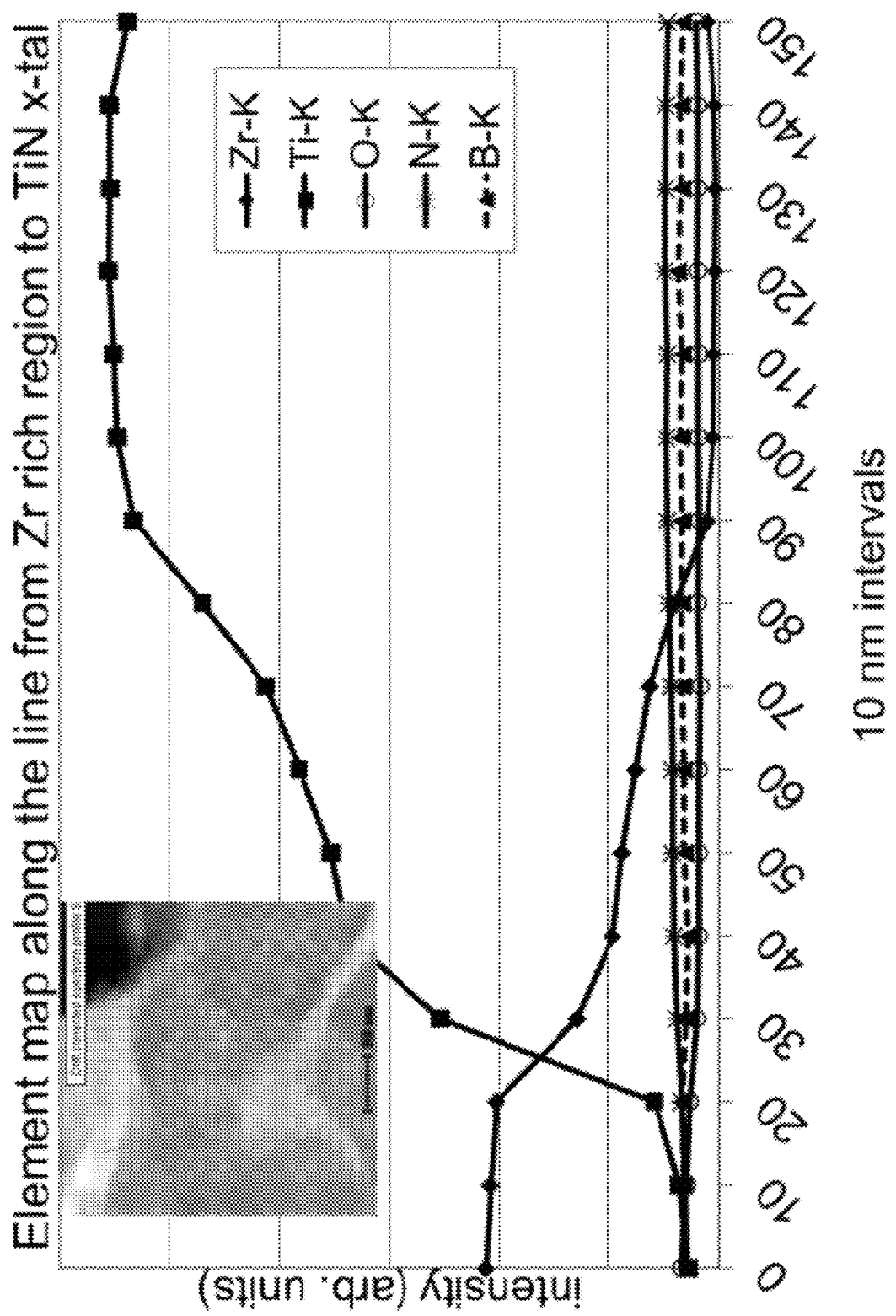
FIG. 22 is an elemental line scan of sample 123-2 done in the TEM showing the distribution of elements near the interface between regions.

A closer analysis of the interface region is shown by the element line scans in FIGS. 21 and 22. In FIG. 21, the scan is done from the Zr region to the cBN particle. The concentration of Zr drops sharply at the interface and B and N are detected in the dark region. But, interestingly there is B and N also present in the Zr rich region. This supports the data from XRD showing the presence of $ZrB_2$ and ZrN. Also detected in the Zr and cBN areas is O, which may be from $ZrO_2$ that was originally added. Another surprise is that Ti is present in the Zr rich region. This suggests there may be also a reaction between $ZrO_2$ and TiN during sintering.

We can now turn our attention to the interface between the Zr region and TiN (FIG. 22). The concentrations of Ti and Zr follow the expected trends, but the interface is not so abrupt. This diffuse interface supports the conclusion that there is reaction between $ZrO_2$ and TiN during sintering. Also detected in both areas are B, N, and O, which supports the XRD data showing the presence of $ZrB_2$, ZrN, and $ZrO_2$.

Figure 23:
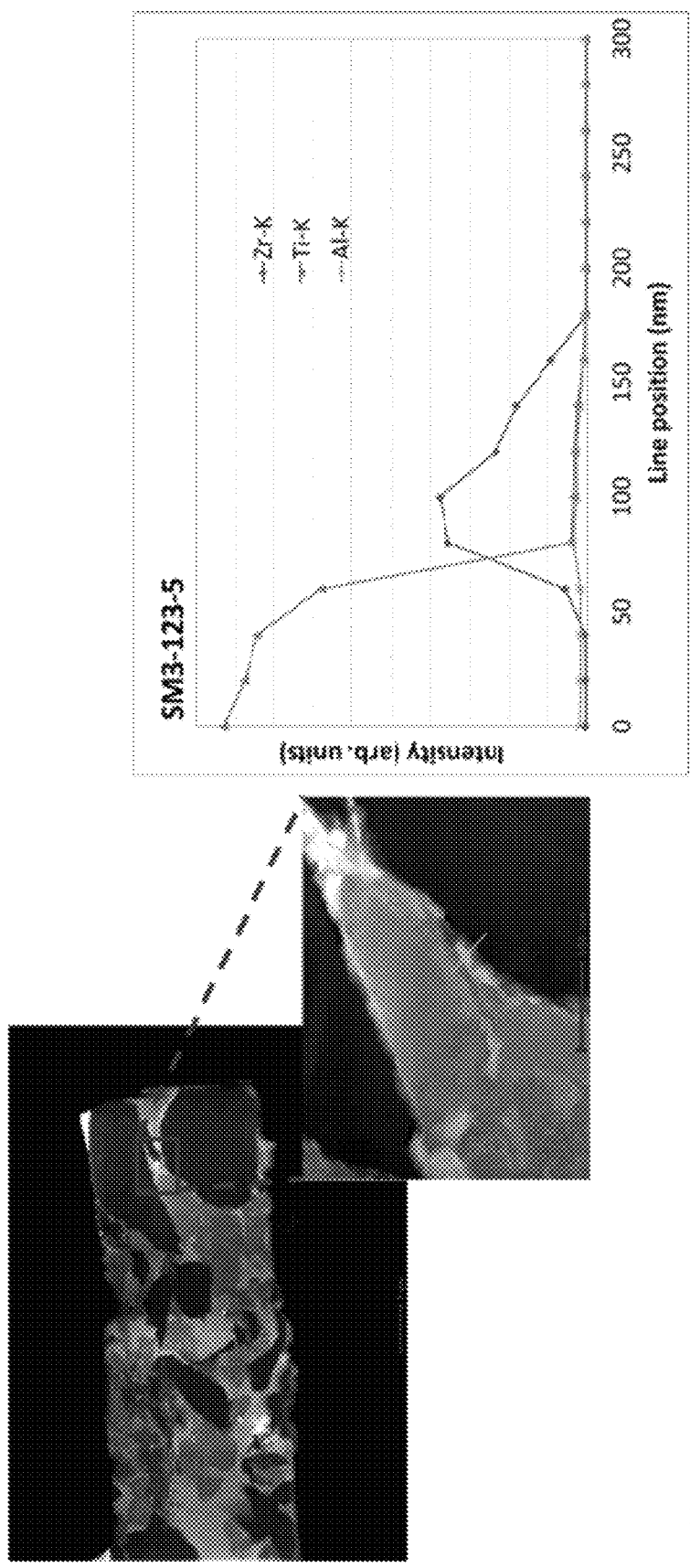
FIG. 23 is an elemental line scan of sample 123-5 done in the TEM showing the distribution of elements near the interface between regions.
Figure 24:
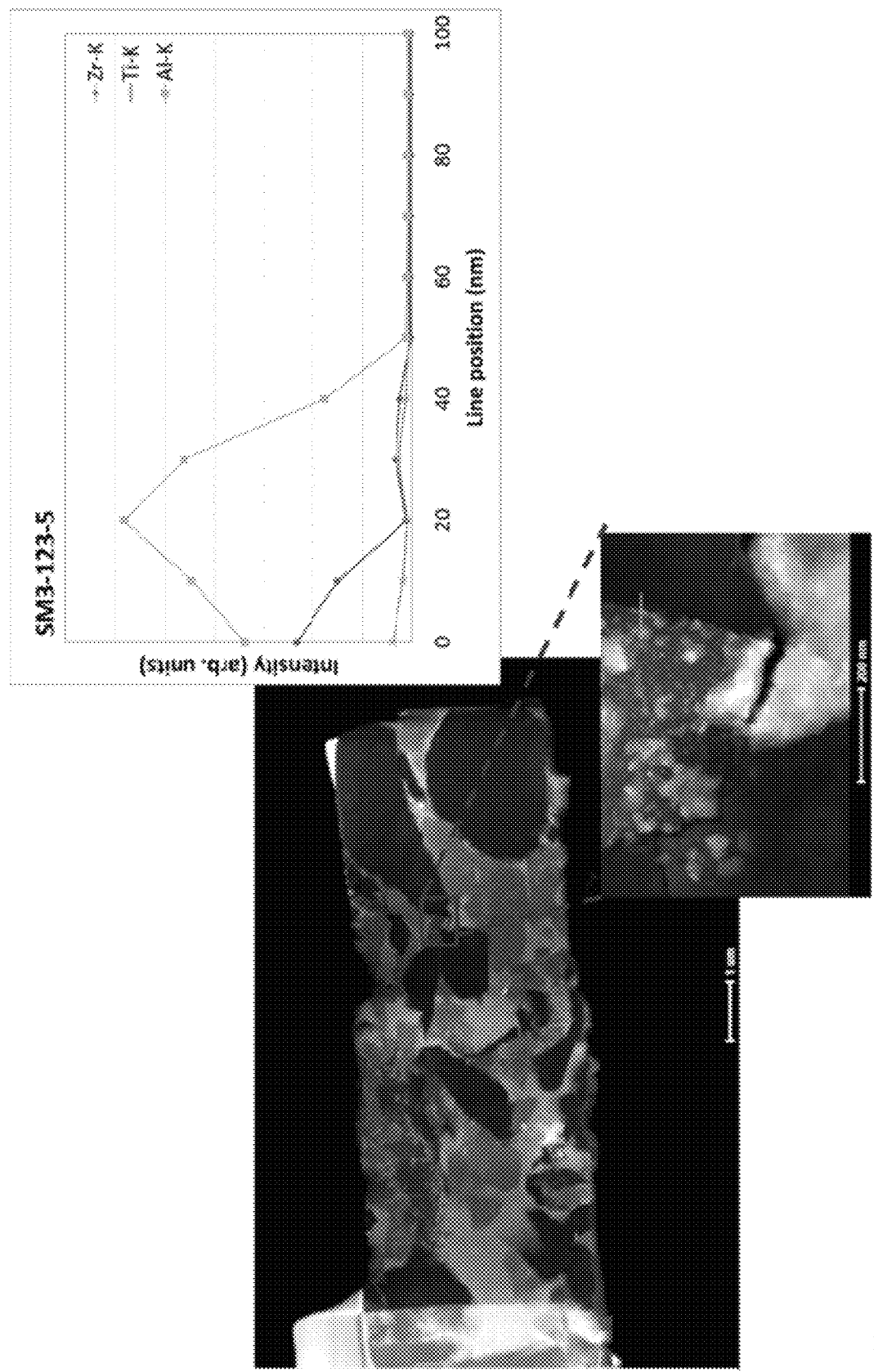
FIG. 24 is an elemental line scan of sample 123-5 done in the TEM showing the distribution of elements near the interface between regions.
Figure 25:
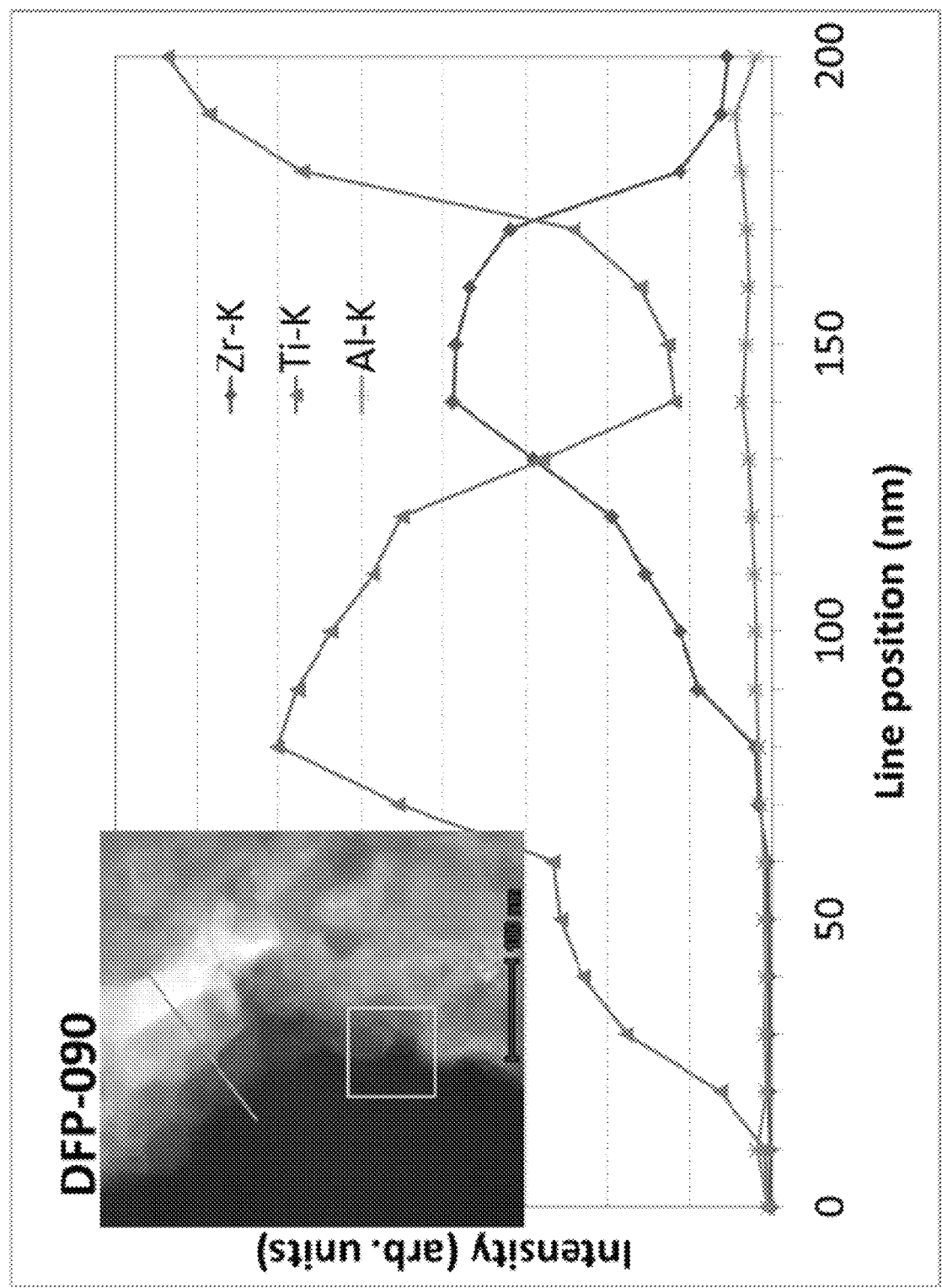
FIG. 25 is an elemental line scan of sample DFP-090 done in the TEM showing the distribution of elements near the interface between regions.

Sample 123-5 is very similar to '123-2 and a similar situation with respect to the interface region arises. The TEM investigations for this sample focused on the distribution of Al. As seen in FIG. 23, which shows a line scan going from a TiN phase, passing through a Zr rich phase, to a cBN grain, there are detectable levels of Al in both the Zr and Ti rich areas. We have seen that O is also present in these areas so the suggestion that some amorphous or poorly crystalline aluminum oxide is present, as required by Equation 1, is reasonable. FIG. 24 shows a line scan from an Al rich area into a cBN grain. Both Ti and Zr are detected in the Al phase, suggesting that Al plays a key role in the reactions of $ZrO_2$ with cBN. Further evidence of this may be seen in the line scan for sample DFP-090 (FIG. 25), going from a cBN grain to Ti rich to a Zr rich, then again to a Ti rich area. The relative concentrations of the elements vary but the boundaries are diffuse. Also, detectable amounts of Al are present and appear to be equally distributed in both Ti and Zr rich regions.

Figure 26:
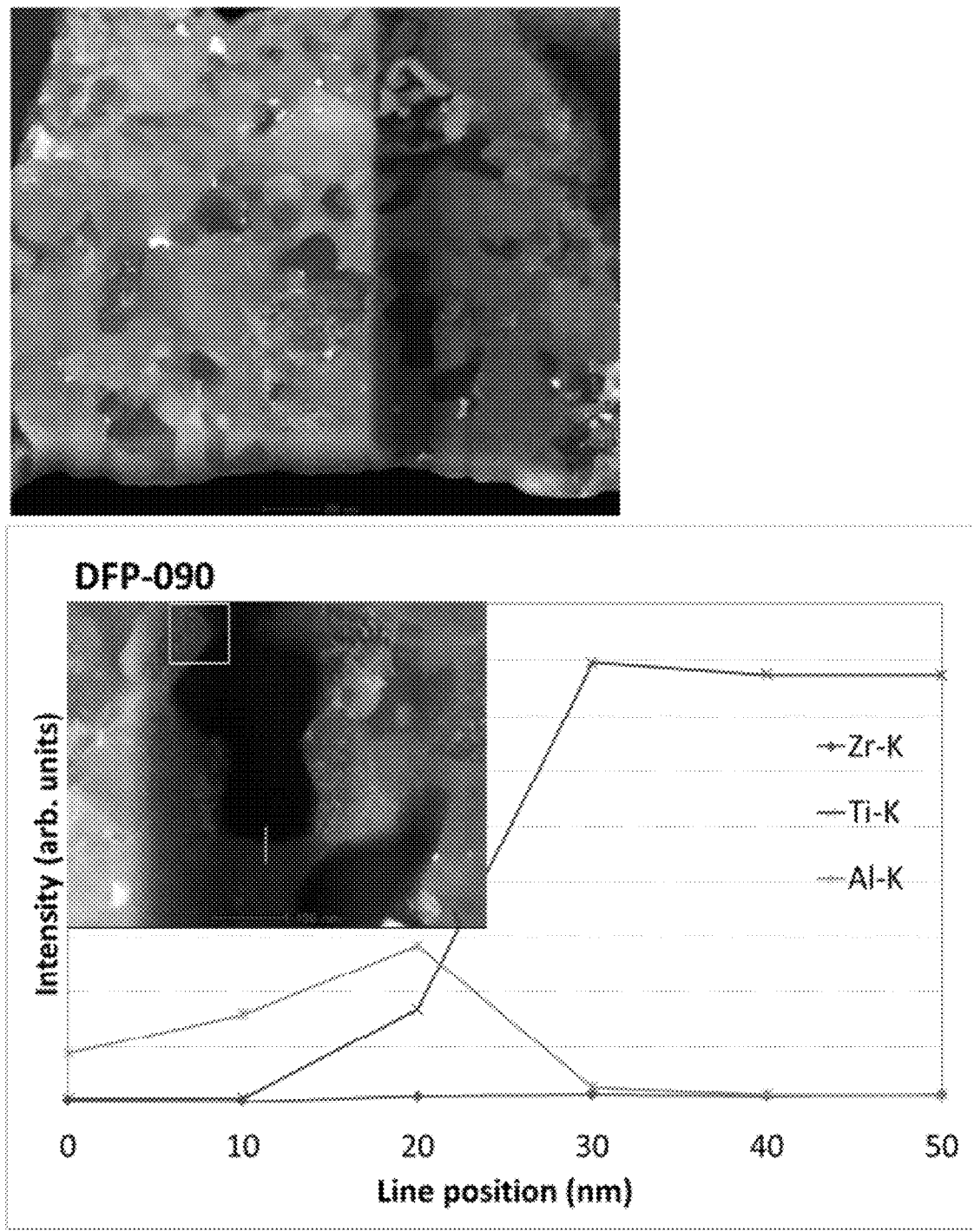
FIG. 26 a TEM image (top) and an elemental line scan (bottom) of sample DFP-090.

Another interesting feature in DFP090 is the presence of dark 'globules' of alumina (FIG. 26) which seem to be evenly distributed throughout the TiN matrix. This was not apparent in the previous samples and can be attributed to the use of sub-micron Al powder in this formulation. The smaller particle size of the Al powder, compared to Al with ~4 μm particle size that was used in the '123' samples apparently allows for a more homogeneous distribution of Al. The elemental line scan (FIG. 26) shows that the interface between these alumina globules and the surrounding TiN matrix is quite abrupt. A similar feature was also seen in DFP091 which also was made with sub-micron Al.

Figure 27:
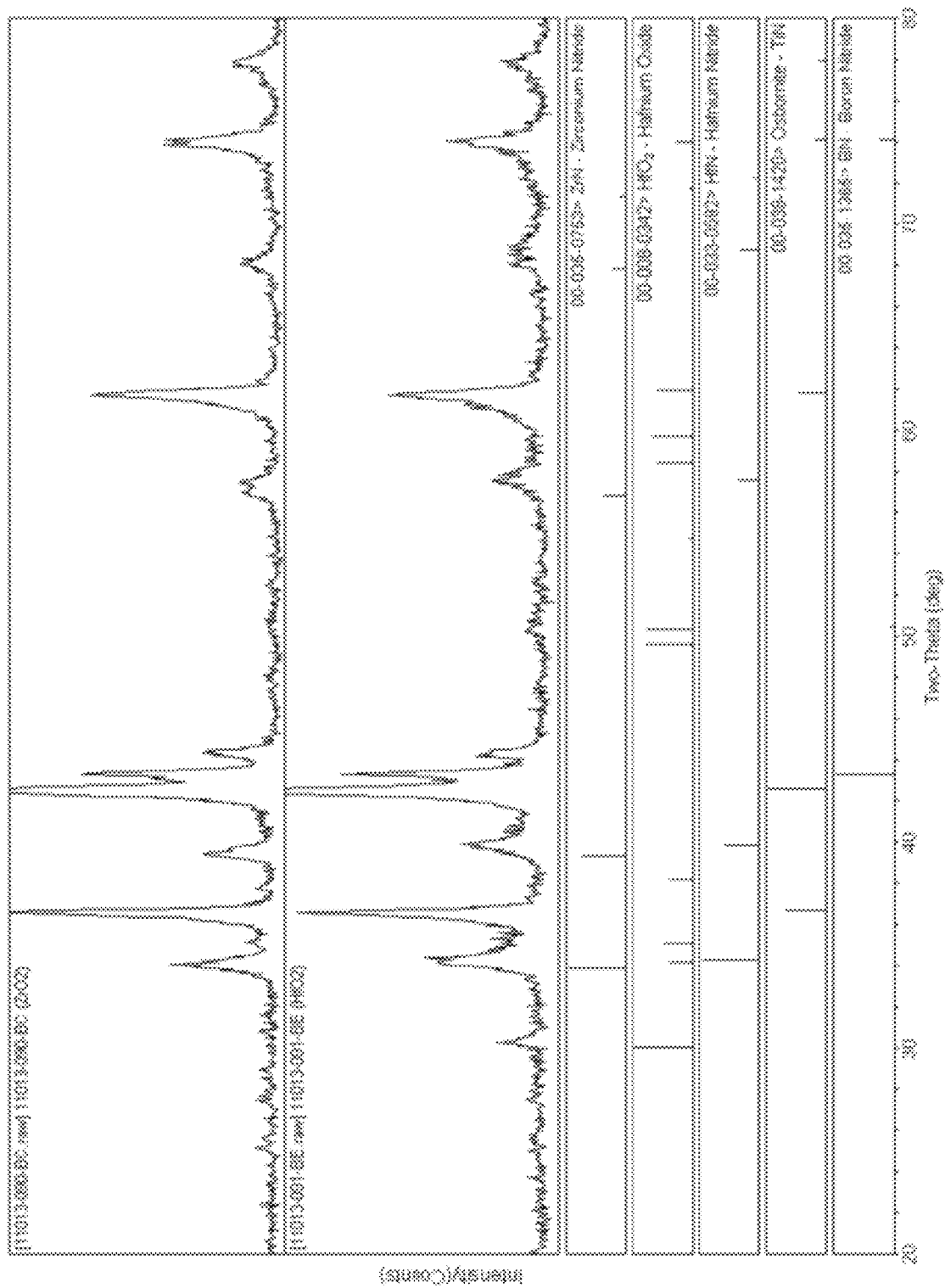
FIG. 27 is XRD spectra of sample DFP-090 and '091.

The XRD patterns of both '090 and '091 are given in FIG. 27 and show that in '090, the only detectable Zr containing phase is ZrN. This is in contrast to what was seen in FIG. 20 in which several Zr containing phases were found.

However, this can be explained by reference to Equation 1 and, which predicts, according to Le Chatelier's principle, that increasing Al (or less ZrO2) will drive the equation to the right and produce more ZrN. This is supported by the results from the designed experiment (DOE) already given in paragraph [60] and FIG. 5. Returning to sample DFP-090, the amount of ZrO2 in that sample is the lowest of the 3 samples, so, it is not surprising that all the ZrO2 is reacted.

Figure 28:
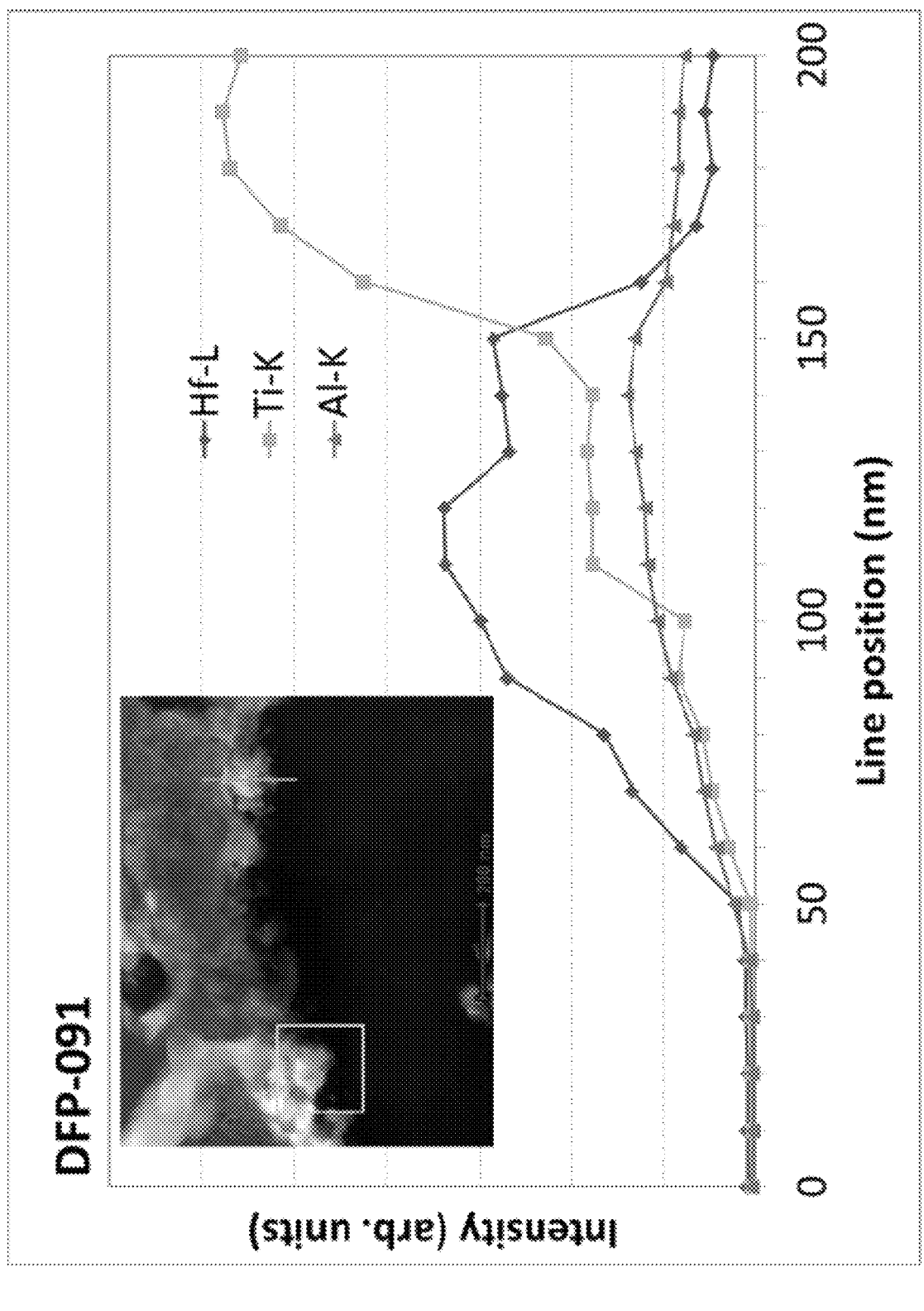
FIG. 28 is an elemental line scan of sample DFP-091.

DFP-091 was made with HfO2, and the XRD pattern (FIG. 27) shows that there is both $HfO_2$ and HfN detected. It is interesting that HfN is formed, indicating some reaction. A line scan of this sample (FIG. 28) shows that there is a lot of interaction between Hf rich and Ti rich areas and that Al is present in appreciable amounts. The Hf appears to be behaving similarly to Zr in this case.

In summary, during sintering at high pressure and temperature, aluminum reacts with the zirconia and cBN to form new phases. Some other possible reactions are presented in equations 2, 3 and 4.

$$4Al + 2BN + 3ZrO_2 \rightarrow 2Al_2O_3 + 2ZrN + ZrB_2 \quad (2)$$

$$4Al + 6ZrO_2 \rightarrow 2Al_2O_3 + 6ZrO \quad (3)$$

$$6Al + 2BN + ZrO_2 \rightarrow 4Al_2O_3 + 2AlN + ZrB_2 + \quad (4)$$

Figure 29:
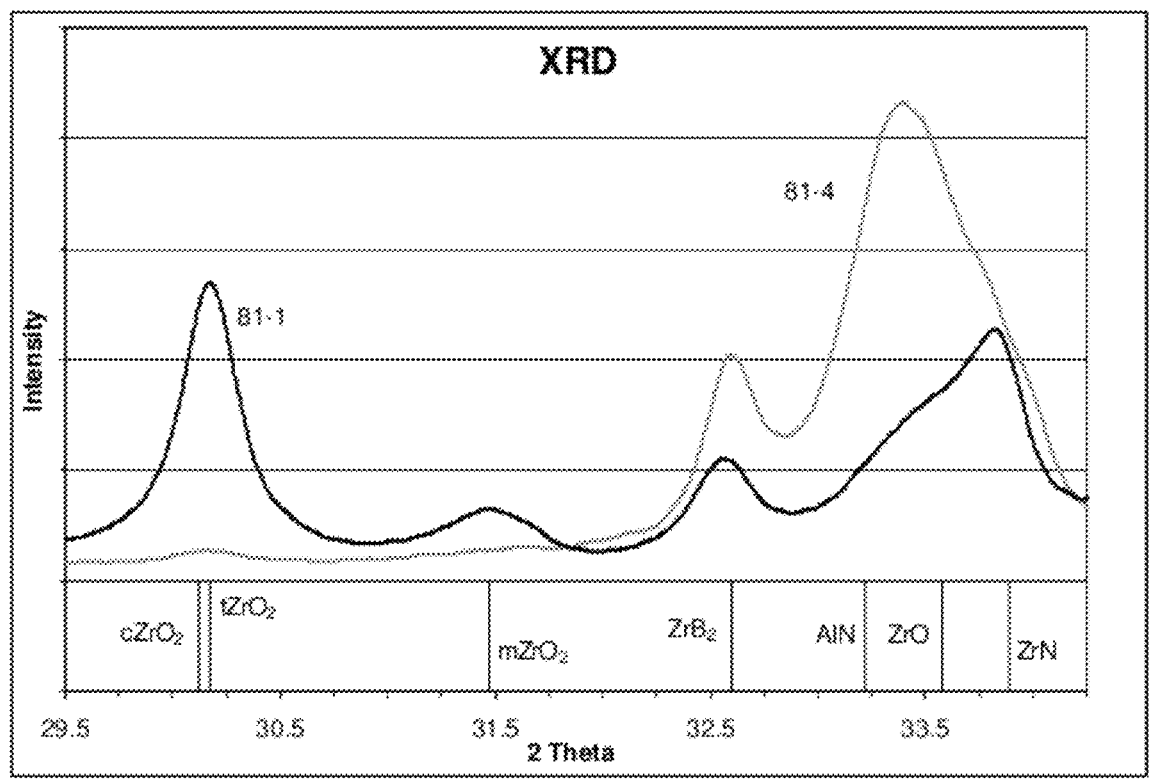
FIG. 29 is XRD spectra from 81-1 and 81-4 showing phases that may be formed during sintering.

FIG. 29 shows an XRD spectrum from samples 81-1 and 81-4 in the region of interest for zirconium containing compounds. Of the phases shown, only the monoclinic $ZrO_2$ ($mZrO_2$) was present prior to sintering. During sintering of sample 81-1, some of the $mZrO_2$ converted to $cZrO_2$ and $tZrO_2$ Some of it also went into the formation of ZrN, $ZrB_2$, and ZrO. Comparison of the XRD spectra of 81-1 and 81-4 shows that with the addition of more Al, more of the $ZrO_2$ reacts. Even with little $ZrO_2$ in the tetragonal or cubic phases, there is still a significant toughening effect. These reactions aid in the sintering process, leading to a more consistently tough compact.

TABLE 1

Formulations of powder blends (in vol. %). Either yttria stabilized (YSZ) or unstabilized zirconia was used. The cBN grain size was between 2-3 μm.

| Sample | Al | cBN | TiN | $ZrO_2$ | Temp (° C.) |
|---|---|---|---|---|---|
| 117A | 6.2 | 47.9 | 34.2 | 11.7 (YSZ) | 1400 |
| 117B | 6.2 | 47.9 | 34.2 | 11.7 | 1400 |
| 117C | 6.2 | 47.9 | 34.2 | 11.7 (YSZ) | 1300 |
| 117D | 6.2 | 47.9 | 34.2 | 11.7 | 1300 |
| 123-1 | 5.0 | 40 | 45 | 10 | 1300 |
| 123-2 | 8.0 | 50 | 32 | 10 | 1300 |
| 123-3 | 5.0 | 40 | 40 | 15 | 1300 |
| 123-3 | 8.0 | 40 | 37 | 15 | 1300 |
| 123-4 | 5.0 | 50 | 30 | 15 | 1300 |
| 123-5 | 8.0 | 50 | 27 | 15 | 1300 |
| 123-6 | 5.0 | 40 | 45 | 10 | 1300 |
| 123-7 | 8.0 | 40 | 42 | 10 | 1350 |
| 123-8 | 5.0 | 50 | 35 | 10 | 1350 |
| 123-9 | 8.0 | 50 | 32 | 10 | 1350 |
| 123-10 | 8.0 | 40 | 37 | 15 | 1350 |
| 123-11 | 5.0 | 50 | 30 | 15 | 1350 |
| 123-12 | 5.0 | 40 | 45 | 10 | 1350 |
| 123-13 | 5.0 | 40 | 45 | 10 | 1350 |
| 123-14 | 5.0 | 40 | 45 | 10 | 1300 |

TABLE 2

Formulations with either YSZ or unstabilized zirconia were pressed at 1300° C. and 45 kBar. Note these contain silicon and no aluminum. All volume percent listings are based on the total vol. % of the compact.

| Sample | Si (vol. %) | cBN (vol. %) | TiN (vol. %) | $ZrO_2$ (vol. %) |
|---|---|---|---|---|
| 118A | 8.4 | 48.0 | 32.0 | 11.6 (YSZ) |
| 118B | 8.4 | 48.0 | 32.0 | 11.6 |

TABLE 3

Formulations prepared by ultrasonic mixing were pressed at 1300° C. and 45 kBar. Weight percents are based upon ingredients into the feed.

| Sample | Al (wt. %) | cBN (wt. %) | TiC (wt. %) | $ZrO_2$ (wt. %) | $Al_2O_3$ (wt. %) |
|---|---|---|---|---|---|
| 81-1 | 3 | 22 | 20 | 15 | 40 |
| 81-2 | 3 | 55 | 22 | 0 | 20 |
| 81-3 | 8 | 52 | 20 | 0 | 20 |
| 81-4 | 8 | 37 | 20 | 15 | 20 |
| 81-5 | 8 | 42 | 30 | 15 | 5 |
| 81-6 | 8 | 22 | 40 | 7.5 | 22.5 |
| 81-7 | 5.5 | 22 | 40 | 15 | 17.5 |
| 81-8 | 5.5 | 22 | 30 | 7.5 | 35 |

TABLE 4

Formulations are given in volume percent. These samples were mixed and spray dried prior to HPHT sintering.

| Sample | Al | cBN | TiN | $ZrO_2$ | HfO2 |
|---|---|---|---|---|---|
| DFP090 | 7.8 | 47.0 | 40.2 | 5.0 | — |
| DFP091 | 7.8 | 47.0 | 39.7 | — | 5.5 |

We claim:

1. A sintered compact comprising:
   cBN in a range of about 5 to about 60 vol. %; and
   ceramic material having zirconium-containing phases that are present in a range of about 10 vol. % to about 15 vol. %, wherein the zirconium-containing phases are selected from a group of oxides, nitrides and borides and combinations thereof, wherein the zirconium-containing phase comprises zirconium oxides that are free of stabilizing agents and have crystal structures comprising at least one of cubic phases and tetragonal phases.

2. The sintered composite compact according to claim 1, wherein the sintered composite compact is sintered to a substrate.

3. The sintered composite compact according to claim 1, wherein the zirconium nitrides are made in-situ.

4. The sintered composite compact according to claim 1, wherein the vol. % cBN is less than about 50.

5. The sintered composite compact according to claim 4, wherein the vol. % cBN is less than about 40.

6. The sintered composite compact according to claim 1, wherein grain size of the cBN is about 1 to about 10 microns.

7. The sintered composite compact according to the claim 1, wherein the ceramic material is selected from the group of nitrides, borides, and carbides of Group IV, $Al_2O_3$ and $Si_3N_4$ and combinations thereof.

8. The sintered composite compact according to the claim 1, wherein the ceramic material includes at least one ceramic material selected from a group of silicon nitride, aluminum nitride, and titanium nitride and combinations thereof.

9. The sintered composite compact according to claim 1, wherein the Zirconium-containing phase is selected from the group of $ZrO_2$ and ZrO and combinations thereof.

10. A method of making a composite compact comprising subjecting, to a high temperature/high pressure process, a composition comprising cBN in a range of about 5 to about 60 vol. %, zirconia in a range of about 10 vol. % to about 20 vol. %, and other ceramic material; wherein the composition is free of zirconia-stabilizing agents and the zirconia is in a monoclinic phase prior to sintering, and wherein all volume percent listings are based on total vol. % prior to the high temperature/high pressure process.

11. The method of claim 10, further comprising bonding the compact to a substrate.

12. The method according to claim 11, wherein the substrate comprises tungsten carbide.

13. The method according to claim 10, wherein the vol. % cBN is less than about 50.

14. The method of claim 13, wherein the vol. % cBN is less than about 40.

15. The method according to claim 10, wherein the other ceramic material is selected from the group of nitrides, borides, and carbides of Group IV, $Al_2O_3$ and $Si_3N_4$ and combinations thereof.

16. The method according to claim 10, further comprising Al or aluminum alloy in an amount of about 2.5 to about 15 vol. %.

17. The method according to claim 16, wherein the Al or aluminum alloy is in a range of about 5 to about 10 vol. %.

18. The method according to claim 17 wherein the aluminum alloy comprises $NiAl_3$.

19. The method according to claim 10, wherein the other ceramic material includes at least one selected from the group of silicon nitride, aluminum nitride, and titanium nitride and combinations thereof.

20. The method according to claim 10, wherein the zirconia particle size is in the range of about 2 to about 3 microns.

21. A method of making a composite compact comprising the step of subjecting, to a high temperature/high pressure process, a composition comprising cBN in a range of about 25 to about 60 vol. %, unstabilized zirconia in a range of about 5 to about 20 vol. %, and other ceramic material, the composition being free of zirconia-stabilizing agent; wherein, prior to the high temperature/high pressure process, the unstabilized zirconia is in the monoclinic phase, and wherein all volume percent listings are based on total vol. %.

22. A method of making a composite compact comprising the steps of:
    mixing a composition comprising zirconia, Al and optionally cBN, and/or TiN, the composition being free of zirconia-stabilizing agent; and reacting, under HPHT conditions, zirconia, Al and optionally cBN, and/or TiN, to form zirconium diboride, aluminum nitride and/or zirconium nitride and/or titanium diboride and/or aluminum oxide and/or other zirconium oxide phases.

23. The sintered compact according to claim 1, wherein the vol. % cBN is less than about 22.

24. The sintered compact according to claim 1, wherein the zirconium oxides have crystal structures that comprise both cubic phases and tetragonal phases.

25. The sintered compact according to claim 1, wherein the zirconium oxides have crystal structures that further comprise monoclinic phase.

26. The method according to claim 10, wherein following subjecting the composition to the high temperature/high pressure process, the composite compact comprises zirconium oxides that have crystal structures comprising at least one of cubic phases and tetragonal phases.

27. The method according to claim 26, wherein the zirconium oxides have crystal structures that comprise both cubic phases and tetragonal phases.

28. The method according to claim 21, wherein following subjecting the composition to the high temperature/high pressure process, the composite compact comprises zirconium oxides that have crystal structures comprising at least one of cubic phases and tetragonal phases.

29. The method according to claim 22, wherein following subjecting the composition to the HPHT process, the composite compact comprises zirconium oxides that have crystal structures comprising at least one of cubic phases and tetragonal phases.

* * * * *